(12) United States Patent
Fan et al.

(10) Patent No.: US 12,145,881 B2
(45) Date of Patent: Nov. 19, 2024

(54) CALCIUM SULFATE SLURRIES INCLUDING CATIONIC STARCH, METHODS FOR USING THEM AND ARTICLES MADE FROM THEM

(71) Applicant: Primary Products Ingredients Americas LLC, Hoffman Estates, IL (US)

(72) Inventors: Fengqui Fan, Hoffman Estates, IL (US); Meggan Hostetler-Schrock, Hoffman Estates, IL (US); Jeremy Iwanski, Hoffman Estates, IL (US)

(73) Assignee: Primary Products Ingredients Americas LLC, Hoffman Estates, IL (US)

( * ) Notice: Subject to any disclaimer, the term of this patent is extended or adjusted under 35 U.S.C. 154(b) by 116 days.

(21) Appl. No.: 17/614,875

(22) PCT Filed: May 29, 2020

(86) PCT No.: PCT/US2020/035347
§ 371 (c)(1),
(2) Date: Nov. 29, 2021

(87) PCT Pub. No.: WO2020/243586
PCT Pub. Date: Dec. 3, 2020

(65) Prior Publication Data
US 2022/0234950 A1    Jul. 28, 2022

Related U.S. Application Data

(60) Provisional application No. 62/855,402, filed on May 31, 2019.

(51) Int. Cl.
| | |
|---|---|
| *C04B 11/00* | (2006.01) |
| *C04B 24/38* | (2006.01) |
| *C04B 26/28* | (2006.01) |
| *C04B 28/14* | (2006.01) |
| *C08B 31/12* | (2006.01) |
| *C08L 3/18* | (2006.01) |
| *C04B 111/00* | (2006.01) |

(52) U.S. Cl.
CPC ........... *C04B 11/002* (2013.01); *C04B 24/38* (2013.01); *C04B 26/28* (2013.01); *C04B 28/14* (2013.01); *C08B 31/125* (2013.01); *C08L 3/18* (2013.01); *C04B 2111/0062* (2013.01); *C04B 2201/10* (2013.01)

(58) Field of Classification Search
CPC ....... C04B 11/002; C04B 24/38; C04B 26/28; C04B 28/14; C04B 2111/0062; C04B 2201/10; C04B 11/00; C04B 24/00; C04B 38/10; C08B 31/125; C08L 3/18
See application file for complete search history.

(56) References Cited

U.S. PATENT DOCUMENTS

| | | | | |
|---|---|---|---|---|
| 5,652,360 A | * | 7/1997 | Tanaka | C08B 31/125 536/55 |
| 5,932,001 A | * | 8/1999 | Graux | C04B 24/38 106/804 |
| 6,162,839 A | | 12/2000 | Klauck | |
| 8,034,203 B2 | | 10/2011 | Xu | |
| 2003/0084980 A1 | | 5/2003 | Seufert | |
| 2004/0045481 A1 | * | 3/2004 | Sethuraman | C04B 28/147 156/39 |
| 2004/0204337 A1 | * | 10/2004 | Corona, III | C11D 3/227 510/515 |
| 2005/0126437 A1 | | 6/2005 | Tagge | |
| 2006/0037515 A1 | * | 2/2006 | Tagge | C08L 1/288 106/163.01 |
| 2010/0075166 A1 | | 3/2010 | Gilley | |
| 2017/0240467 A1 | | 8/2017 | Gehrig | |

FOREIGN PATENT DOCUMENTS

| | | | | |
|---|---|---|---|---|
| EP | 1 701 926 B1 | | 3/2016 | |
| GB | 2063282 A | * | 6/1981 | ............. A61L 15/60 |
| WO | 2019122787 A1 | | 6/2019 | |

OTHER PUBLICATIONS

Maize vocabulary [retrieved from internet at Jan. 24, 2024 from <URL:https://www.vocabulary.com/dictionary/maize> and way back machine <https://web.archive.org/web/20140718054529/http://www.vocabulary.com:80/dictionary/maize>]. (Year: 2014).*

(Continued)

*Primary Examiner* — Anthony J Green
*Assistant Examiner* — Marites A Guino-O Uzzle
(74) *Attorney, Agent, or Firm* — Neal, Gerber & Eisenberg LLP

(57) ABSTRACT

The present disclosure relates more particularly to calcium sulfate-based slurries useful, for example, in making gypsum boards for building construction, as well as methods for using them, e.g., to make gypsum boards, in one aspect, the present disclosure provides a calcium sulfate slurry composition comprising calcium sulfate present substantially in the form of one or more hydrates, the calcium sulfate being present in an amount in the range of 70-99.8 wt % on a dry basis, calculated as stucco; and a cationic starch present in an amount of 0.10-10 wt % of the amount of calcium sulfate as stucco on a dry basis, the cationic starch being substituted with amine and/or ammonium groups and having a % N value in the range of 0.10 wt. % to 2 wt %, and an RVA viscosity value of at least 100 cP at 65° C. and 16 wt %; and water, in an amount sufficient to form a slurry. The disclosure also provides gypsum-based materials useful as building materials, e.g., for use as building boards in construction of walls and ceilings of buildings.

25 Claims, 6 Drawing Sheets

(56) References Cited

OTHER PUBLICATIONS

International Search Report and Written Opinion in International Patent Application No. PCT/US2020/035347, dated Sep. 17, 2020.

* cited by examiner

CALCIUM SULFATE SLURRIES INCLUDING CATIONIC STARCH, METHODS FOR USING THEM AND ARTICLES MADE FROM THEM

CROSS REFERENCE TO RELATED APPLICATION

This application is a U.S. National Phase of International Application No. PCT/US2020/035347, filed May 29, 2020, which claims priority to U.S. Provisional Patent Application No. 62/855,402, filed May 31, 2019, both of which are incorporated by reference herein in their entirety.

BACKGROUND OF THE DISCLOSURE

1. Field of the Disclosure

The present disclosure relates generally to calcium sulfate-based materials. The present disclosure relates more particularly to calcium sulfate-based slurries useful, for example, in making gypsum boards for building construction, as well as methods for using them, e.g., to make gypsum boards, and articles containing them.

2. Technical Background

Gypsum board is typically used to make residential and commercial building interior walls. It has advantages over plaster walls because it is relatively easy to install, has lower costs, and requires minimal finishing.

Gypsum wallboard typically includes a gypsum (i.e., calcium sulfate dihydrate) core sandwiched between two sheets of facing material (e.g., paper, fiberglass mat). The gypsum core is commonly produced from a gypsum slurry that is prepared as a mixture of dry and wet ingredients. The dry ingredients consist primarily of calcium sulfate hemihydrate (known as "stucco"), and may include, but are not limited to, any combination of accelerator, foaming agents, crystal modifiers, boric acid and/or a natural polymer such as starch. The wet ingredients consist of water and a variety of other components that commonly include, but are not limited to, dispersants, retarders, polymers, wax emulsion, silicone, surfactants, and thickening agent. The water provides a significant portion of the liquid that forms the gypsum slurry of the core composition of the wallboard.

Methods for manufacturing gypsum wallboard are well known in the art and commonly involve a continuous process. The wet and dry ingredients are typically mixed together in a pin mixer to create a fluid mixture or "slurry". This slurry reacts relatively quickly to set, via a hydration reaction, in which stucco (i.e., the hemihydrate) is hydrated to form gypsum (i.e., the dihydrate), according to the following equation:

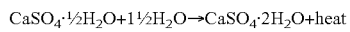

$$CaSO_4 \cdot \tfrac{1}{2}H_2O + 1\tfrac{1}{2}H_2O \rightarrow CaSO_4 \cdot 2H_2O + \text{heat}$$

By this process and the subsequent drying of water in excess of the dihydrate the liquid, flowable slurry is converted to a solid form.

The slurry is discharged from the mixer through the mixers outlet chute or "boot" which spreads the slurry onto a moving, continuous sheet of bottom facing material. After the slurry is discharged onto the bottom facing material, a moving, continuous sheet of top facing material is placed on the slurry and facing material is folded along the edges of the slurry, so that the slurry is contained between the top and bottom facing materials. This assembly then passes through a forming station which forms the wallboard to the desired thickness and width; the speed of the conveyer is typically selected such that at this point, the slurry has reacted enough to provide a material that is set enough to be formed.

The board travels along a belt line for several minutes, during which time the material continues to set and dry. The boards are then cut into a desired length and fed into a large, continuous oven to complete the drying. During the drying process, the excess water (free water) is evaporated from the gypsum core while the chemically bound water is retained in the newly formed gypsum material.

The hydration reaction time can be controlled to a certain extent by the use of additives such as accelerators and retarders. Those processes require wet boards to have strong compressive strength. Generally, wet strength decreases with density of board. Starches and other additives are known to provide improvement to wet and dry core strength.

Conventional gypsum board is relatively dense, such that when it is shipped, trucks are limited by weight rather than volume. Since a significant portion of the cost of gypsum board is freight, it is desirable to reduce the weight of gypsum board without sacrificing strength. In addition, lighter boards are easier to handle and install. And lighter weight structural units can be made in larger sizes yet still remain convenient to install, which can also reduce manufacturing costs per unit of area.

During the preceding decade, i.e., the 2010s, a number of producers entered the market with lightweight gypsum boards. A decrease in density, e.g., by using foaming agents during board manufacture, can undesirably result in reduced physical properties such as compressive strength and nail pull resistance. Accordingly, the trend of lightweight materials requires the development of additives to further improve core strength during the manufacturing process (wet or green strength), and strength in the ultimate end use of the materials (e.g., nail pull and compressive strength).

Acid-modified starches, are commonly added to the gypsum slurry with the dry and/or wet ingredients, to improve the compressive strength of the wallboard and strengthen the paper to core bond. These anionic starches are believed to act as a co-binder to improve the adhesion between the gypsum crystals in the gypsum core, and can increase the core strength and nail pull of the wallboard. The starch similarly improves the adhesion between the gypsum crystals and the fibers of the facing material (e.g., cellulose fibers in a paper facing) at the facing-core interface. Heating and drying of the wallboard causes acid-modified starches to gel and migrate with the evaporating water to the paper-core interface. Once cooled, the starch forms a film and acts as a binder between the facers and the core and between the gypsum crystals (i.e. a co-binder). Its presence at the paper-core interface causes a stronger bond to form between the gypsum core and the facing material.

But improvements in the use of starches in gypsum boards are still needed.

SUMMARY OF THE DISCLOSURE

One aspect of the disclosure is a calcium sulfate slurry, the calcium sulfate slurry including
  calcium sulfate present substantially in the form of one or more hydrates, the calcium sulfate being present in an amount in the range of 70-99.8 wt % on a dry basis, calculated as stucco;
  a cationic starch (e.g., in granular form) present in an amount of 0.10-10 wt % of the amount of calcium sulfate as stucco on a dry basis, the cationic starch being substituted with amine and/or ammonium groups and having a % nitrogen value in the range of 0.10 wt % to 2 wt %, and an RVA viscosity value of at least 100 cP at 65° C. and 16 wt % water, in a water-stucco ratio in the range of 0.3-1.5.

Notably, the slurries of the disclosure can provide relatively high strength at relatively low density. For example, in certain embodiments, the slurries of the disclosure can provide an increased wet compressive strength of at least 3% greater than that of the same formulation lacking starch. The slurries of the disclosure can advantageously be provided with one or more foaming agents in order to provide low density materials.

Another aspect of the disclosure is a method for making a gypsum-based material, the method comprising
providing a slurry described herein;
allowing the slurry to set via hydration of stucco to gypsum;
allowing the set slurry to dry.

Another aspect of the disclosure is a gypsum-based material comprising
calcium sulfate present substantially in the form of gypsum, the calcium sulfate being present in an amount in the range of 70-99.8 wt % on a dry basis, calculated as stucco; and
a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %.

Notably, the gypsum-based materials described herein can provide relatively high strength at relatively low density. For example, in certain embodiments, the gypsum-based materials can provide an increased dry compressive strength of at least 20% greater than that of the same formulation lacking starch. The materials of the disclosure can advantageously be provided with one or more foaming agents in order to provide low density materials.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
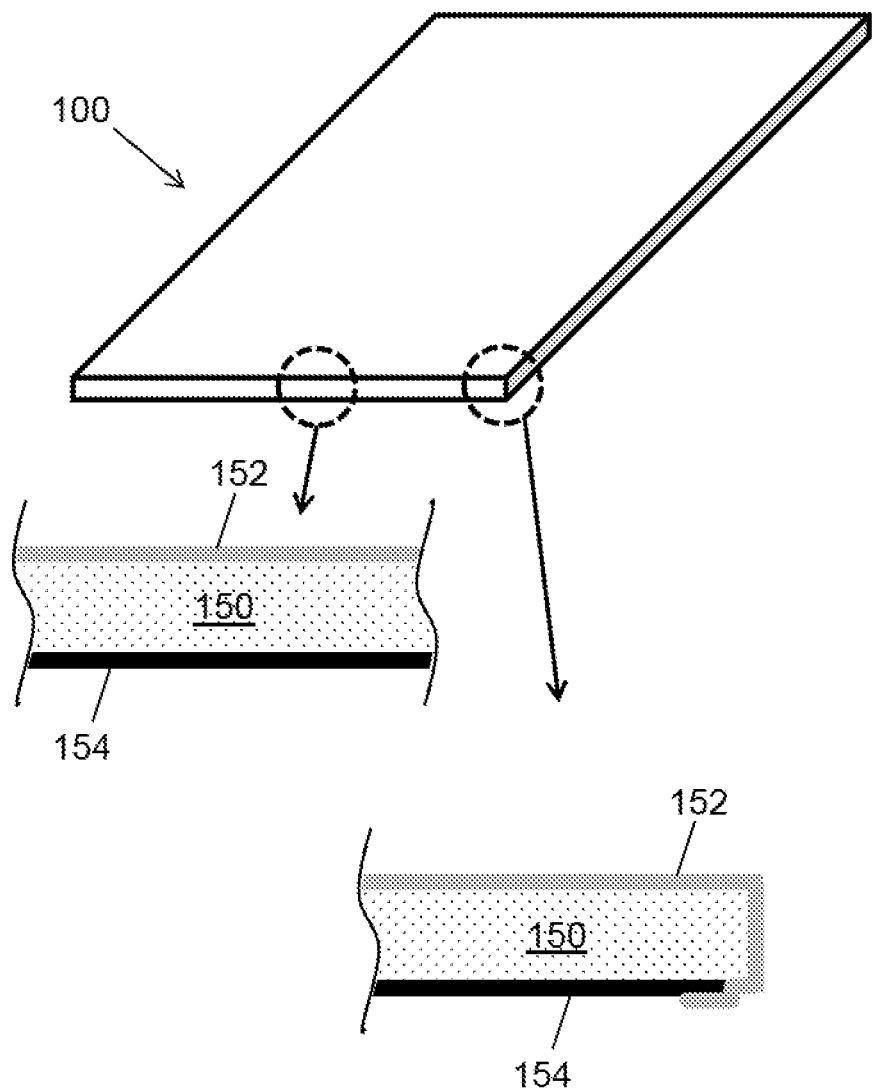
FIG. 1. provides a schematic perspective view, with two inset cross-sectional schematic views, of a gypsum building board according to one embodiment of the disclosure.

As noted above, the calcium sulfate slurries used to make gypsum wallboards conventionally include a starch material. Conventional starches used for such purposes include modified starches, such as those thinned by enzyme treatment, and/or reacted with various modifying agents.

The present inventors have unexpectedly determined that use of a cationic starch having certain properties can provide a number of advantages. This cationic starch surprisingly provides green and dry strength to the gypsum composition so that lighter-weight gypsum materials, particularly gypsum wallboard, can be successfully used. Without intending to be bound by theory, the present inventors surmise that the use of a cationic starch as described herein allows the formation of a network of polymer and inorganic particles that synergistically increases the nail pull resistance and strength of the composition. It is believed that the cationic starch disperses substantially throughout the composite by dissolution and are retained within composite by the ionic interactions, which prevents excessive migration to the surfaces of the composite.

Accordingly, in one aspect, the disclosure provides a calcium sulfate slurry, the calcium sulfate slurry including
calcium sulfate present substantially in the form of one or more hydrates, the calcium sulfate being present in an amount in the range of 70-99.8 wt % on a dry basis, calculated as stucco;
a cationic starch present in an amount of 0.10-10 wt % of the amount of calcium sulfate as stucco on a dry basis, the cationic starch being substituted with amine and/or ammonium groups and having a % nitrogen value in the range of 0.10 wt % to 2 wt %, and an RVA viscosity value of at least 100 cP at 65° C. and 16 wt %;
water, in a water-stucco ratio in the range of 0.3-1.5.

Notably, the calcium sulfate slurry includes a cationic starch. As used herein, a "cationic starch" is a starch that has been chemically modified to provide the starch with a net positive charge in aqueous solution by the introduction of amine and/or ammonium groups to the starch. Non-limiting examples of such groups are (trialkylammonium)alkyl groups such as 3-(trimethylammonium)-2-hydroxypropyl and 3-(dimethylstearylammonium)-2-hydroxypropyl; they can be incorporated via the corresponding (trialkylammonium)-1,2-epoxyalkanes. See pages 113-125 of Solarek, D. B., Cationic Starches in Modified Starches: Properties and Uses, Wurzburg, O. B., Ed., CRC Press, Inc., Boca Raton, Fla. 1986, which is hereby incorporated herein by reference in its entirety. Particular substituents bearing ammonium and/or amino groups are described in further detail below.

The cationic starches described herein can be provided in a variety of forms. In certain embodiments as otherwise described herein, the cationic starch is incorporated into the calcium sulfate slurry in the form of granular starch (i.e., in the form of substantially intact starch granules). That is, the starch has not been cooked or gelatinized before being added to the slurry, and is in the slurry in a substantially uncooked/ungelatinized form. In other embodiments a pregelatinized cationic starch as otherwise described herein can be used, alone or in combination with a granular cationic starch.

Based on the disclosure herein, the amount of the cationic starch can be selected to provide significant increases in strength of gypsum materials. In certain embodiments as otherwise described herein, the cationic starch is present in the slurry in an amount of 0.10 to 10 wt % of the amount of calcium sulfate in the slurry, calculated as stucco on a dry basis (i.e., for purposes of the calculation, assuming that all calcium sulfate is present in the slurry as stucco and any other water present is liquid water and not part of the "dry" material). For example, in certain embodiments as otherwise described herein, the cationic starch is present in an amount in the range of 0.25-5 wt %, e.g., 0.25-2 wt %, of the amount of calcium sulfate as stucco on a dry basis. In certain embodiments as otherwise described herein, the cationic starch is present in an amount in the range of 0.5-10 wt %, e.g., 0.5-7 wt %, 0.5-5 wt %, or 0.5-2 wt %, of the amount of calcium sulfate as stucco on a dry basis. In certain embodiments as otherwise described herein, the cationic starch is present in an amount in the range of 1-10 wt %, e.g., 1-7 wt % or 1-5 wt %, of the amount of calcium sulfate as stucco on a dry basis. In certain embodiments as otherwise described herein, the cationic starch is present in an amount in the range of 2-10 wt %, e.g., 2-7 wt %, 2-5 wt %, or 5-10 wt %, of the amount of calcium sulfate as stucco on a dry basis.

Cationic starches suitable for use in the methods and articles of the disclosure can have a variety of amounts of nitrogen-based substituents incorporated therein. The wt % of nitrogen in the material is a convenient way to quantify the level of cationic substituents. As used herein, the % N (i.e., weight percent of nitrogen) is quantified using the Kjeldahl method. Based on the disclosure herein, the amount of the cationic starch can be selected to provide significant increases in strength of gypsum materials. For example, in certain embodiments as otherwise described herein, the cationic starch has a % N value in the range of 0.10 wt % to 2 wt %. In certain such embodiments, the cationic starch has a % N value in the range of 0.13-2.0 wt %, e.g., 0.15-2 wt %, or 0.2-2.0 wt %. In certain such embodiments, the cationic starch has a % N value in the range of 0.10-1.8 wt %, e.g., 0.13-1.8 wt %, or 0.15-1.8 wt %, or 0.2-1.8 wt %. In certain such embodiments, the cationic starch has a % N value in the range of 0.10-1.5 wt %, e.g., 0.13-1.5 wt %, or 0.15-1.5 wt %, or 0.2-1.5 wt %. In certain such embodiments, the cationic starch has a % N value in the range of 0.10-1.0 wt %, e.g., 0.13-1.0 wt %, or 0.15-1.0 wt %, or 0.2-1 wt %. In certain such embodiments, the cationic starch has a % N value in the range of 0.10-0.8 wt %, e.g., 0.13-0.8 wt %, or 0.15-0.8 wt %, or 0.2-0.8 wt %. In certain such embodiments, the cationic starch has a % N value in the range of 0.10-0.5 wt %, e.g., 0.13-0.5 wt %, or 0.15-0.5 wt %, or 0.2-0.5 wt %.

Cationic starches of a broad range of viscosities can be suitable in the formation of gypsum articles, depending, for example, on the particularities of the additives used, the process parameters, and the properties of the desired gypsum article. Based on the disclosure herein, the viscosity of the cationic starch can be selected to provide activity in the articles and processes of the disclosure. A reliable, industry-standard method of measuring starch viscosity uses the Rapid Visco Analyzer (RVA) by Perten. The RVA instrument may be configured with different time-temperature profiles and paddle speeds. The instrument is equipped with a menu of standard profiles. RVA viscosities described herein are determined using a modified "Standard 1 Version 5 (December 1997)" profile. A suspension (28.0 g) containing 16% starch (w/w, dry starch basis, dsb) in water is equilibrated at 50° C. for 1 min, heated to 95° C. over 3.7 min, held at 95° C. for 11.5 min, cooled to 65° C. over 1.8 min, and held at 65° C. for 2 min. The rotating speed for the paddle is 960 rpm for the first 16 minutes, then 160 rpm thereafter. The viscosity is recorded at the end of the profile.

For example, in certain embodiments as otherwise described herein, the starch has an RVA viscosity value of at least 100 cP at 65° C. and 16 wt %. In certain such embodiments, the cationic starch has an RVA viscosity value in the range of 100-4000 cP, e.g., 200-3000 cP, or 200-2000 cP, or 200-1500 cP, at 65° C. and 16 wt %. In certain such embodiments, the cationic starch has an RVA viscosity value of at least 200 cP at 65° C. and 16 wt %. In certain such embodiments, the cationic starch has an RVA viscosity value in the range of 200-4000 cP, e.g., 200-3000 cP, or 200-2000 cP, or 200-1500 cP, at 65° C. and 16 wt %. In certain such embodiments, the cationic starch has an RVA viscosity value of at least 350 cP at 65° C. and 16 wt %. the cationic starch has an RVA viscosity value in the range of 350-4000 cP, e.g., 350-3000 cP or 350-2000 cP, at 65° C. and 16 wt %. In certain such embodiments, the cationic starch has an RVA viscosity value of at least 500 cP, e.g., at least 1000 cP, at 65° C. and 16 wt %. In certain such embodiments, the cationic starch has an RVA viscosity value in the range of 500-4000 cP, e.g., 500-3000 cP, 500-2000 cP, 1000-4000, or 1000-3000, at 65° C. and 16 wt %. In certain such embodiments, the cationic starch has an RVA viscosity value of at least 2000 cP, e.g., at least 3000 cP or at least 4000 cP, at 65° C. and 16 wt %. In certain such embodiments, the cationic starch has an RVA viscosity value in the range of 100-1000 cP, e.g., 150-1000 cP or 200-1000 cP, at 65° C. and 16 wt %.

The viscosity of a cationic starch can be reduced using any of a number of thinning processes. For example, in certain embodiments as otherwise described herein the cationic starch is thinned by hydrolysis, e.g., acid-catalyzed hydrolysis, and enzymatic hydrolysis. In certain embodiments as otherwise described herein, the cationic starch is thinned by bleaching. Thinning can be used to provide a cationic starch from a desired source (see below) and having a desired viscosity.

The water solubility of the granular cationic starches of the disclosure can be rather low. For example, in certain embodiments as otherwise described herein, the granular cationic starch has a water solubility no more than 3%, e.g., no more than 2%, or even no more than 1.5%. Water solubility is determined as described in U.S. Pat. No. 5,932,001, which is hereby incorporated herein by reference in its entirety. 200 mL of distilled water at 20° C. are introduced into a 50 mL beaker fitted with a magnetic stirrer. 5 g of the cationic starch is added, with stirring, and the mixture allowed to stir for 15 minutes. The homogenized mixture thus obtained is then centrifuged for 10 minutes at 4,000 rpm and at 23° C. 25 mL of supernatant liquid are then removed and introduced into a tared, oven-dried vessel. The vessel with its contents are placed in a ventilated oven at 60° C. until the water evaporates, then for 1 hour in a controlled air circulation oven at 103±2° C. The vessel is then introduced into a drier to be cooled to ambient temperature, and then reweighed. The solubility in water ("SW"), expressed as a percentage by mass of initial product, is given by the formula "SW"=((M×200)/(25×P))×100, in which M is the mass of the residue, in g; and P is the mass of the test sample, in g.

As described above, a variety of substituents can be used to provide a starch with cationic character. For example, in certain embodiments, the cations of the cationic starch are substantially provided by modification with groups having the formula $(R^1)_3N^+$-L-, where each $R^1$ is individually $C_1$-$C_8$ alkyl, L is hydroxy-substituted $C_2$-$C_6$ alkandiyl, and the -L- makes an ethereal bond to a glucoside of the starch. In certain embodiments, the cations of the cationic starch are substantially provided by modification with groups having the formula $(R^1)(R^2)_2N^+$-L-, where each $R^1$ is individually $C_1$-$C_{20}$ alkyl (e.g., stearyl, dodecyl), each $R^2$ is individually $C_1$-$C_3$ alkyl (e.g., methyl), L is hydroxy-substituted $C_2$-$C_6$ alkandiyl, and the -L- makes an ethereal bond to a glucoside of the starch. Such substituents can be bound to the starch using the corresponding epoxides, using conventional starch modification methodologies.

In certain embodiments as otherwise described herein, the cationic starch does not substantially include modification other than cationic modification and acid thinning. Thus, in certain embodiments, the cationic starch is an acid-thinned cationic starch or an otherwise unmodified cationic starch.

But in other embodiments, the cationic starch has one or more additional modifications. Based on the disclosure herein, additional modifications can be selected based on the knowledge in the art to provide desired properties to the starch, the slurries and the articles made therewith.

In certain embodiments as otherwise described herein, the cationic starch is modified by cross-linking. A variety of cross-linking methods can be used, for example, chemical cross-linking by disubstituted phosphate, by adipate, or by epichlorohydrin. Cross-linking can also be effected by dehydration, for example, through acid-catalyzed heating.

However, in alternative embodiments, the cationic starch is not modified by cross-linking.

In certain embodiments as otherwise described herein, the cationic starch is modified by esterification and/or etherification. Esterification can be, for example, in the form of acetate esters, e.g., by reaction with acetic anhydride. Etherification can be, for example, in the form of ethyl, hydroxyethyl and/or hydroxypropyl ethers, e.g., by reaction with an ethylating agent, ethylene oxide or propylene oxide.

However, in alternative embodiments, the cationic starch is not modified by esterification or etherification.

In certain embodiments as otherwise described herein, the cationic starch is modified by amphoteric modification, i.e., modification with anionic substituents, such as phosphate, octenylsuccinate or succinate. Despite being modified with anionic substituents, however, the starch remains cationic, i.e., with a net positive charge. The cationic character of such starches can be characterized with reference to an effective % N value, i.e., the % N value of an equivalent net charge purely cationic starch.

However, in certain alternative embodiments, the cationic starch is not modified by amphoteric modification.

In certain embodiments as otherwise described herein, the cationic starch is modified by oxidation. However, in alternative embodiments, the cationic starch is not modified by oxidation.

The cationic starches described herein can have a variety of degrees of cationic substitution. As used herein, the "degree of substitution" of cationic starches is an average measure of the number of hydroxyl groups on each anhydroglucose unit that are derivatized by substituent groups. Since each anhydroglucose unit has three potential hydroxyl groups available for substitution, the maximum possible degree of substitution is 3. The degree of substitution is expressed as the number of moles of substituent groups per mole of anhydroglucose unit, on a molar average basis. The degree of substitution can be determined using proton nuclear magnetic resonance spectroscopy ("$^1$H NMR") methods well-known in the art. Suitable $^1$H NMR techniques include those described in "Observation on NMR Spectra of Starches in Dimethyl Sulfoxide, Iodine-Complexing, and Solvating in Water-Dimethyl Sulfoxide", Qin-Ji Peng and Arthur S. Perlin, Carbohydrate Research, 160 (1987), 57-72; and "An Approach to the Structural Analysis of Oligosaccharides by NMR Spectroscopy", J. Howard Bradbury and J. Grant Collins, Carbohydrate Research, 71, (1979), 15-25. As used herein, the net degree of cationic substitution is the degree of substitution with cationic groups less the degree of substitution with anionic groups. In certain embodiments as otherwise described herein, the cationic starch has a net degree of cationic substitution in the range of 0.01 to 0.25, e.g., 0.01 to 0.20, or 0.01 to 0.15. In certain embodiments as otherwise described herein, the cationic starch has a net degree of cationic substitution in the range of 0.02 to 0.50, e.g., 0.02 to 0.25, or 0.02 to 0.20, or 0.02 to 0.15. In certain embodiments as otherwise described herein, the cationic starch has a net degree of cationic substitution in the range of 0.05 to 0.50, e.g., 0.05 to 0.25, or 0.05 to 0.20, or 0.05 to 0.15. In certain embodiments as otherwise described herein, the cationic starch has a net degree of cationic substitution in the range of 0.01 to 0.12, e.g., 0.02 to 0.12, or 0.05 to 0.12. In certain embodiments as otherwise described herein, the cationic starch has a net degree of cationic substitution in the range of 0.01 to 0.10, e.g., 0.02 to 0.10, or 0.05 to 0.10.

The cationic starches of the disclosure can be based on a variety of natural starches. For example, in certain embodiments as otherwise described herein, the cationic starch is a dent maize starch. And in other embodiments as otherwise described herein, the cationic starch is a waxy maize starch.

In other embodiments as otherwise described herein, the cationic starch is a tapioca starch, e.g., a non-waxy tapioca starch or a waxy tapioca starch. And in other embodiments as otherwise described herein, the cationic starch is a potato starch, e.g., a non-waxy potato starch or a waxy potato starch. Other starches can be used, e.g., a wheat starch, a rice starch (e.g., a waxy rice starch, a glutinous rice starch or a sweet rice starch), an oat starch, a barley starch (e.g., a waxy barley starch), a sago starch, or a mixture thereof.

Native starches typically comprise one or more of two distinct types of glucose polymers: amylose and amylopectin. Amylose is substantially linear, with glucose units being linked by alpha→1,4 glucosidic bonds. Amylopectin has a branched structure, with linear stretches having glucose units linked by alpha→1,4 glucosidic bonds, joined by alpha→1,6-bound branch points. In certain embodiments as otherwise described herein, the cationic starch includes amylose in an amount in the range of 0 to 70 wt % (e.g., 0-60 wt %, 0-50 wt %) and amylopectin in an amount in the range of 30 to 100 wt % (e.g., 40-100 wt %, 50-100 wt %). In certain embodiments as otherwise described herein, the cationic starch comprises as amylose in an amount in the range of 20-30 wt %, and amylopectin in an amount in the range of 70-80 wt %.

As described above, the calcium sulfate slurry includes calcium sulfate substantially in the form of one or more hydrates, the calcium sulfate being present in an amount in the range of 70-99.8 wt % on a dry basis, calculated as stucco. As the person of ordinary skill in the art will appreciate, calcium sulfate slurries are typically made by mixing dry stucco (i.e., calcium sulfate hemihydrate) with water; as such, at the time of mixing, the calcium sulfate is substantially in the form of stucco. But upon contact with water the stucco reacts to form hydrates with greater amounts of water, resulting eventually in the formation of gypsum. Accordingly, depending on the aging of the mixture and the presence of any accelerants or retarders, at any given point in time a calcium sulfate slurry of the disclosure can include a number of different calcium sulfate hydration states. For the purposes of calculating amounts of calcium sulfate in a slurry, all calcium sulfate is assumed to be in the hemihydrate hydration state of stucco. Such calculations are made on a dry basis, i.e., excluding water that is not assumed to be part of calcium hydrate hemihydrate.

Depending on the amount of starch and the amount of other components such as fibers, fillers, accelerants, retardants, surfactants and foaming agents, the amount of calcium sulfate in the calcium sulfate slurries of the disclosure can vary. In certain embodiments as otherwise described herein, the calcium sulfate is present in the slurry in an amount in the range of 70-99 wt %, e.g., 70-98 wt %, 70-95% or 70-90%, on a dry basis calculated as stucco. In certain embodiments as otherwise described herein, the calcium sulfate is present in the slurry in an amount in the range of 80-99.8 wt %, e.g., 80-99 wt %, 80-98 wt % or 80-95%, on a dry basis calculated as stucco.

As described above, the calcium sulfate slurries of the disclosure can be made by a method that includes combining stucco with water. There are two forms of stucco, alpha and beta, produced by different calcination methods; either is suitable for use in the compositions and processes described herein. As the person of ordinary skill in the art will appreciate, the cationic starch and any other components can be added before the stucco is combined with the water (as part of the stucco component and/or as part of the liquid component), after the stucco is combined with the water, or at the same time the stucco is combined with the water.

The water:stucco ratio can be an important parameter, since the relative amount of water used will help to determine the fluid properties of the slurry (especially in consideration of the size and shape of the stucco particles), but excess water must eventually be driven off by heating, which is expensive due to the high cost of the fuels used in the heating process. It can therefore be desirable for the amount of process water (and thus the water-stucco ratio) to be kept low. In certain embodiments as otherwise described herein, the water:stucco ratio is in the range of 0.3-1.5 on a weight:weight basis, with calcium sulfate being calculated as stucco. In certain embodiments as otherwise described herein, the water:stucco ratio is in the range of 0.3-1.0 on a weight:weight basis, with calcium sulfate being calculated as stucco.

Together with the cationic starch, any of a number of other starches can be used in the calcium sulfate slurries of the disclosure. For example, in certain embodiments as otherwise described herein, the calcium sulfate slurry includes one or more non-cationic starches, for example, selected from unmodified starch, an ethylated starch, a hydroxyethylated starch, a hydroxypropylated starch, a hydrolyzed starch, an acid-modified starch or an oxidized starch. In certain embodiments, however, no more than 0.05 wt % (and in certain embodiments substantially no) unmodified starch, an ethylated starch, hydroxyethylated starch, hydroxypropylated starch, hydrolyzed starch or oxidized starch is present. In certain embodiments as otherwise described herein, the calcium sulfate slurry includes one or more anionic starches and/or amphoteric non-cationic starches. In certain embodiments, however, no more than 0.05 wt % of the (and in certain embodiments substantially no) anionic starches and/or amphoteric non-cationic starches are present. And in certain desirable embodiments, substantially no (e.g., no more than 0.05 wt %) additional starch is present. The amounts of these starches are measured on a dry basis relative to the amount of calcium sulfate as stucco. In certain desirable embodiments, substantially no (e.g., no more than 0.05 wt % of the amount of calcium sulfate as stucco on a dry basis) anionic polymer is present in the slurry.

The calcium sulfate slurries of the disclosure can include other components that are conventional in the art, e.g., in the formation of gypsum building boards. For example, in certain embodiments as otherwise described herein, the calcium sulfate slurry can include a fibrous material, e.g., glass fiber and paper fiber. Such materials can be provided in a variety of amounts, e.g., in an amount in the range of 2-15 wt % on a dry basis relative to calcium sulfate determined as stucco.

In certain desirable embodiments as otherwise described herein, a calcium sulfate slurry of the disclosure includes one or more foaming agents. Advantageously, a foaming agent can be used to form a slurry that can provide an ultimate gypsum material having a relatively low density (e.g., no more than 0.8 g/cm$^3$, or no more than 0.7 g/cm$^3$, or no more than 0.6 g/cm$^3$, or no more than 0.5 g/cm$^3$) through the introduction of voids in the material. As described above and in the Examples below, the use of the cationic starches described herein can provide such low-density materials with unexpectedly high strength. Foaming agents are typically surfactants. Particular foaming agents that can be suitable in certain embodiments include, for example, soaps (e.g., rosin soaps), alkyl sulfates, alkyl ether sulfates, and other surfactants. These can in some embodiments be included with stabilizer such as fatty alcohol. Foaming agents are typically present in a total amount up to 0.5 wt %, e.g., in the range of 0.01 to 0.5 wt %. The person of ordinary skill in the art will select a type and amount of foaming agent to provide a desired density to a final product, and can use the foaming agents to provide foam to the slurry in a conventional manner (e.g., by pre-forming a foamed volume of foaming agent before adding it to the slurry).

In certain desirable embodiments as otherwise described herein, the calcium sulfate slurry further includes a dispersant. A dispersant can be used to help improve workability, especially in cases of a lower water:stucco ratios. Dispersants that can be suitable in certain embodiments include, for example, sulfonated naphthalene condensates, lignosulfonates, acrylic-polyether comb-branched copolymers and polycarboxylic esters. The person of ordinary skill in the art will select a type and amount of dispersant to provide a desired workability to the stucco.

A variety of other additives can be included in the calcium sulfate slurry. Examples include, for example, set accelerators (e.g., potash, ammonium sulfate, aluminum sulfate, ball mill accelerator); set retarders (e.g., amino acid oligomers, chelators like DTPA and EDTA, and polyacrylic acids); boric acid; sodium trimetaphosphate; sugar; silicones and waxes; fire retardant fillers such as vermiculite; and biocides.

Notably, the present inventors have determined that cationic starches as described herein can provide advantageous performance even in cases where no alkyl diketene dimer is present. Accordingly, in certain embodiments, the slurries and gypsum-based materials of the disclosure include substantially no alkyl diketene dimers or reaction products thereof, i.e., no more than 0.01 or no more than 0.005 wt % on a dry basis.

The calcium sulfate slurries described herein can be used in a variety of processes to make a variety of products.

For example, another aspect of the disclosure is a method for making a gypsum-based material. The method includes providing a calcium sulfate slurry as described in any embodiment or combination of embodiments described herein; allowing the slurry to set via hydration of stucco to gypsum; and allowing the set slurry to dry. In certain embodiments, e.g., in the production of building boards, the slurry is formed against one or more liners. A variety of materials for such liners are known, e.g., paper and fiberglass mesh. The slurry can alternatively be formed in a mold. Conventional methods, such as those described above, can be used to mix the slurry, dispense it onto a liner or into a mold, allow it to set and allow it to dry.

Another aspect of the disclosure is a gypsum-based material. The gypsum-based material includes calcium sulfate present substantially in the form of gypsum, the calcium sulfate being present in an amount in the range of 70-99.8 wt % on a dry basis, calculated as stucco; a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %.

The calcium sulfate of such material is present substantially in the form of gypsum. For example, in certain embodiments as otherwise described herein, at least 90 mol % (e.g., at least 95 mol %) of the calcium sulfate is present in the form of gypsum.

The gypsum-based material can desirably be in the form of, for example, a monolithic set slurry. The methods described herein result in a matrix of interlocking gypsum crystals, which can provide the gypsum-based material in a single piece with high strength. Such materials can be formed as building boards, among a wide variety of other useful articles.

The cationic starches described above with respect to the calcium sulfate slurries of the disclosure can be present in the gypsum-based materials, in similar amounts. However, in certain embodiments, a non-gelatinized cationic starch will have partially or fully gelatinized during the processing to form the board, especially given the exothermicity of the gypsum hydration reaction. And in some cases there will be a distribution of concentrations of cationic starch in the material, as the starch can in some cases migrate toward the liner to help provide increased bonding between the liner and the gypsum. Moreover the other components of the gypsum slurries as described herein can likewise appear in the gypsum-based materials described herein.

In certain desirable embodiments, the gypsum-based material has a density of less than 0.7 g/cm$^3$. Notably, the use of the cationic starches as described herein can provide even low-density materials with increased strength.

The gypsum-based materials described herein can be in the form of a building board. One embodiment of a building board is shown in schematic perspective view with two inset schematic cross-sectional views in FIG. 1. Building board 100 includes gypsum-based material 150, enveloped by one or more liners, here, two liners 152 and 154. The edge inset shows how one liner is folded over the other; this is common in the fabrication of building boards. The liners can be made of a variety of materials, e.g., paper or fiberglass mesh The building board can be formed in any convenient size. For example, in certain embodiments, the building board is a rectangular solid having a longest dimension of at least 1 m, a second-longest dimension of at least 1 m, and a thickness of no more than 5 cm In certain such embodiments, the longest dimension is at least 2 m, e.g., at least 3 m or at least 4 m. In certain such embodiments, the thickness is no more than 3 cm, e.g., no more than 2 cm. Typical sizes for building boards are 48 inches wide, 8, 10, 12 or 14 feet long, and ⅜ inch or ½ inch thick.

In certain desirable embodiments, the building boards of the disclosure can be relatively light in weight. For example, in certain embodiments, the building boards of the disclosure have a weight in the range of 1000 to 1500 lbs per 1000 square feet (lbs/MSF). In certain embodiments, a building board of the disclosure has a weight in the range of 1000-1400 lbs/MSF, e.g., 1000-1300 lbs/MSF. In certain embodiments as otherwise described herein, the building boards of the disclosure have a weight in the range of 1100-1500 lbs/MSF, e.g., 1100-1400 lbs/MSF or 1100-1300 lbs/MSF. In certain embodiments as otherwise described herein, the building boards of the disclosure have a weight in the range of 1200-1500 lbs/MSF, e.g., 1100-1400 lbs/MSF. In certain embodiments as otherwise described herein, the building boards of the disclosure have a weight in the range of 1300-1500 lbs/MSF. Such building boards can be, for example, in the range of 5/16-9/16 inch thickness.

In certain embodiments, the gypsum-based materials described herein can be relatively light in weight. One way to measure this is with respect to building board weight as described above, as this is often a figure of merit for the building board industry. However, the person of ordinary skill in the art will appreciate that another measure of weight is material density. In certain embodiments as otherwise described herein, gypsum materials as described herein (e.g., made from the slurries as described herein) have a density in the range of 0.3-0.8 g/cm$^3$. For example, in certain embodiments, gypsum materials as described herein have a density in the range of 0.3-0.7 g/cm$^3$, e.g., 0.3-0.6 g/cm$^3$, or 0.3-0.5 g/cm$^3$. In certain embodiments, gypsum materials as described herein have a density in the range of 0.4-0.8 g/cm$^3$, e.g., 0.4-0.7 g/cm$^3$, or 0.4-0.6 g/cm$^3$. In certain embodiments, gypsum materials as described herein have a density in the range of 0.5-0.8 g/cm$^3$, e.g., 0.5-0.7 g/cm$^3$.

Notably, the slurries described herein can be used to provide gypsum-based materials with desirable physical properties, while having reduced weight. For example, in certain embodiments as otherwise described herein, the slurries of the disclosure can provide an increased wet compressive strength of at least 3% greater than that of the same formulation lacking starch. As used herein, the wet compressive strength is determined as described Example 6, below. For example, in certain embodiments, a slurry of the disclosure provides an increased wet compressive strength of at least 5%, e.g., at least 10% greater than that of the same formulation lacking starch. In certain embodiments, a slurry of the disclosure provides an increased wet compressive strength in the range of 3-24%, e.g., 5-24% or 10-24% greater than that of the same formulation lacking starch. In certain embodiments, a slurry of the disclosure provides an increased wet compressive strength in the range of 3-20%, e.g., 5-20% or 10-20% greater than that of the same formulation lacking starch. In certain embodiments, a slurry of the disclosure provides an increased wet compressive strength in the range of 3-15%, e.g., 5-15% or 10-15% greater than that of the same formulation lacking starch.

As demonstrated in the Examples below, the use of cationic starches as described herein can provide improved results as compared to the use of a conventional acid-thinned starch. In certain embodiments, a slurry of the disclosure provides an increased wet compressive strength of at least 5%, e.g., at least 10% or at least 15% greater than that of the same formulation using an otherwise unmodified acid-thinned starch of the same RVA viscosity instead of the cationic starch (i.e., in equal concentrations). In certain embodiments, a slurry of the disclosure provides an increased wet compressive strength in the range of 5-27%, e.g., 10-27% or 15-27% greater than that of the same formulation using an acid-thinned starch instead of the cationic starch. In certain embodiments, a slurry of the disclosure provides an increased wet compressive strength in the range of 5-20%, e.g., 10-20% or 15-20% greater than that of the same formulation using an acid-thinned starch instead of the cationic starch. In certain embodiments, a slurry of the disclosure provides an increased wet compressive strength in the range of 5-15%, e.g., 10-15% greater than that of the same formulation using an acid-thinned starch instead of the cationic starch.

The slurries and gypsum materials can provide increased dry strength as well. For example, in certain embodiments as otherwise described herein, a slurry or gypsum-based material as described herein provides an increased dry compressive strength of at least 20% greater than that of the same formulation lacking starch. As used herein, the dry compressive strength of a slurry is determined as described Example 6, below. For dry compressive strength of a fabricated gypsum-based material, samples 1" square are cut at the maximum thickness of the material or 1" in thickness, whichever is greater; the measurement is performed as in Example 6 with compression applied along the thin axis. For example, in certain embodiments, a slurry of the disclosure provides an increased dry compressive strength of at least 30%, e.g., at least 40% greater than that of the same formulation lacking the cationic starch. In certain embodiments, a slurry of the disclosure provides an increased dry compressive strength in the range of 20-75%, e.g., 30-75% or 40-75% greater than that of the same formulation lacking starch. In certain embodiments, a slurry of the disclosure provides an increased dry compressive strength in the range of 4-30%, e.g., 5-30% or 10-30% greater than that of the same formulation lacking starch. In certain embodiments, a slurry of the disclosure provides an increased dry compressive strength in the range of 3-20%, e.g., 5-20% or 10-20% greater than that of the same formulation lacking starch.

As demonstrated in the Examples below, the use of cationic starches as described herein can provide improved results as compared to the use of a conventional acid-thinned starch. In certain embodiments, a slurry of the disclosure provides an increased dry compressive strength of at least 4%, e.g., at least 10% or at least 15% greater than that of the same formulation using an otherwise unmodified acid-thinned dent corn starch having an RVA viscosity of 1100 cP instead of the cationic starch (i.e., in equal concentrations). In certain embodiments, a slurry of the disclosure provides an increased dry compressive strength in the range of 4-37%, e.g., 10-37% or 15-37% greater than that of the same formulation using an otherwise unmodified acid-thinned dent corn starch having an RVA viscosity of 1100 cP instead of the cationic starch. In certain embodiments, a slurry of the disclosure provides an increased dry compressive strength in the range of 4-30%, e.g., 5-30% or 10-30% greater than that of the same formulation using an otherwise unmodified acid-thinned dent corn starch having an RVA viscosity of 1100 cP instead of the cationic starch. In certain embodiments, a slurry of the disclosure provides an increased dry compressive strength in the range of 3-20%, e.g., 5-20% or 10-20% greater than that of the same formulation using an otherwise unmodified acid-thinned dent corn starch having an RVA viscosity of 1100 cP instead of the cationic starch.

The present inventors have noted that the use of granular cationic starches can be advantaged over the conventional use of pregelatinized cationic starches. In certain embodiments, a slurry of the disclosure provides an increased wet compressive strength in the range of 3-24%, e.g., 5-24% or 7-24% greater than that of the same formulation using an otherwise identical pregelatinized cationic starch instead of the cationic starch.

Figure 9:
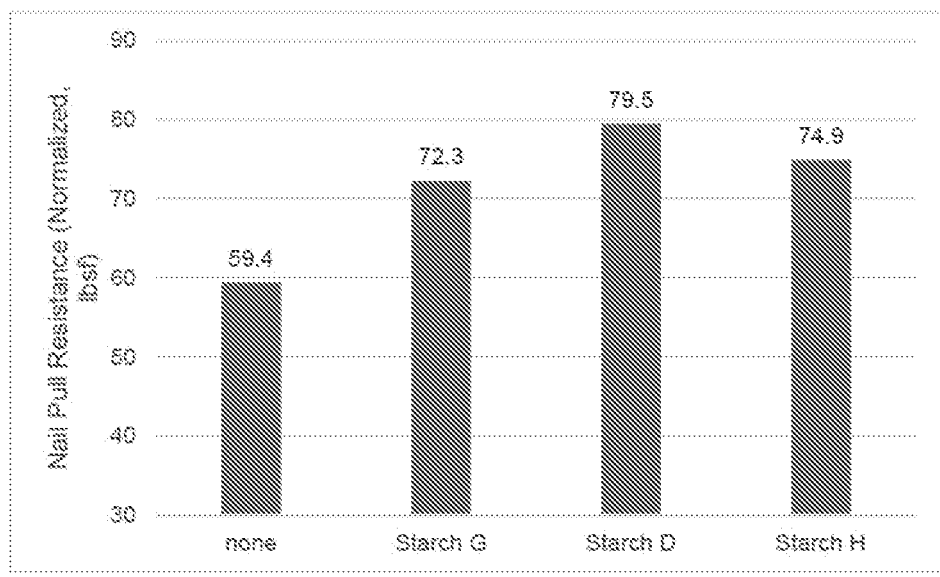
FIG. 9 provides a bar graph of data of Table 4.
Figure 10:
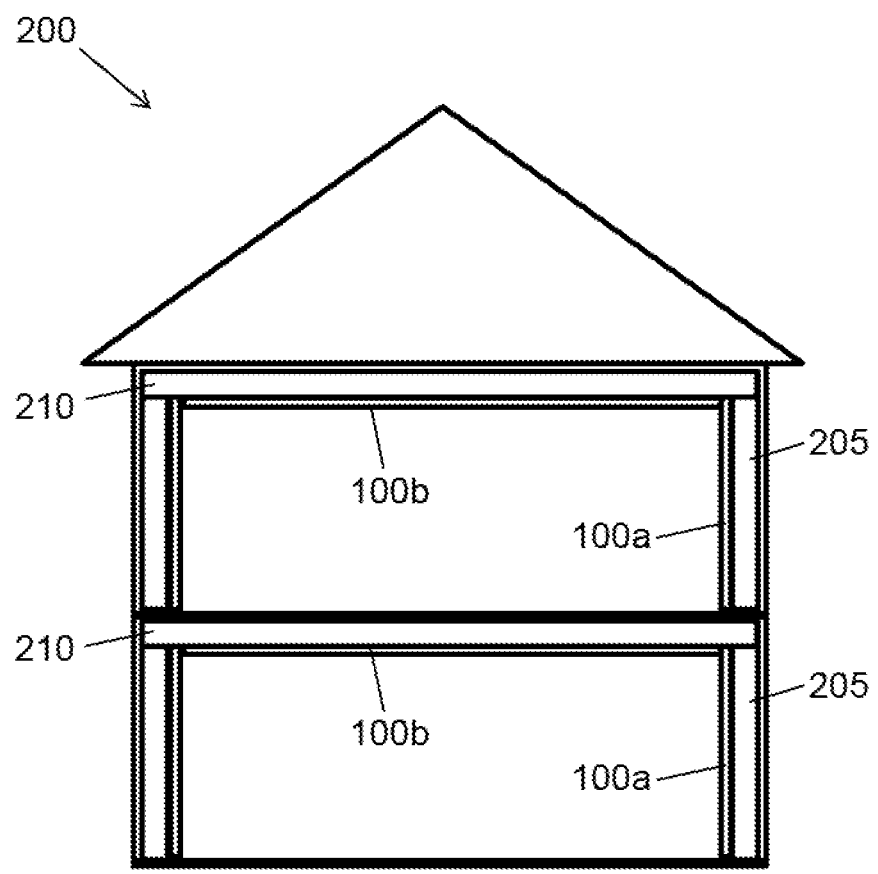
FIG. 10 is a schematic cross-sectional view of a building structure according to certain embodiments of the disclosure.

Another aspect of the disclosure is a building structure including a gypsum-based material as described herein, e.g., in the form of a building board. For example, in certain embodiments, the gypsum-based material is in the form of a wallboard forming a wall of the building. In other embodiments, the gypsum-based material is in the form of a board forming a ceiling of the building. The materials described herein can be used, for example, in commercial buildings and in residential buildings. Walls and ceilings of buildings can be made, for example, by affixing a gypsum-based material as described herein (e.g., in the form of building boards) to one or more framing members (e.g., studs or joists, made out of any desirable material such as wood or metal) of the building structure. As the person of ordinary skill in the art will appreciate, fasteners like screws or nails can be used to affix the gypsum-based material to the framing members. An embodiment of a building structure is shown in cross-sectional schematic view in FIG. 9. Building structure 200 includes wall studs 205 and ceiling joists 210. Building boards 100*a* are affixed to the wall studs 205, while building boards 100*b* are affixed to ceiling joists 210.

Thus, another aspect of the disclosure is a method of using a gypsum-based material in a building board or a building structure (e.g., as a wall or a ceiling). The gypsum-based material includes calcium sulfate present substantially in the form of gypsum, the calcium sulfate being present in an amount in the range of 70-99.8 wt % on a dry basis, calculated as stucco; and a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %, and can further be as otherwise described herein. The method can include providing the gypsum-based material in or on the building structure, e.g., as part of a wall or ceiling thereof.

The following examples further illustrate the materials and methods of the disclosure. They should not be construed as in any way limiting the scope of the disclosure.

EXAMPLES

TABLE 1

Starches used in the experiments

| | Description | % N | RVA viscosity (cP) |
|---|---|---|---|
| Starch A | Commercial granular cationic dent modified | 0.41 | 4100 ± 10 |
| Starch B | Commercial granular cationic waxy modified | 0.37 | 3700 ± 10 |
| Starch C | Commercial granular amphoteric waxy modified (net positive charge) | 0.23; effective net positive charge equivalent to 0.18% N | 2680 ± 10 |
| Starch D | Commercial granular cationic dent modified | 0.23 | 270 ± 10 |

TABLE 1-continued

Starches used in the experiments

| | Description | % N | RVA viscosity (cP) |
|---|---|---|---|
| Starch E | Commercial granular cationic potato modified | 0.24 | 2455 ± 10 |
| Starch F | Commercial granular cationic tapioca modified | 1.2 | 1500 ± 10 |
| Starch G | Commercial granular dent acid thinned | 0 | 1100 ± 10 |
| Starch H | Commercial Pregelatinized Unmodified Corn Flour | 0 | |

Example 1—Cationic Dent Starch Thinning

Starch A (500 g) is suspended in 750 g water at the temperature of 45° C., and then transferred to a reactor equipped with a condenser and a mechanical stirrer. To the viscous solution thus obtained, hydrochloric acid (36% aqueous solution, 17 g) is added all at once, whilst continuing the stirring. After 8 hours, soda ash is added to the slightly slurry to neutralize pH=5-7. The slurry is filtered off and dried to moisture of 7.64% at 40° C. The viscosity of the final product, determined by RVA as described above is 255±10 cP at 65° C. at 16% solid content in DI water.

Example 2—Cationic Dent Starch Thinning

Starch A (500 g) is suspended in 750 g water at the temperature of 45° C., and then transferred to a reactor equipped with a condenser and a mechanical stirrer. To the viscous solution thus obtained, hydrochloric acid (38% aqueous solution, 17 g) is added all at once, whilst continuing the stirring. After 4 hours, soda ash is added to the slightly slurry to neutralize pH=5-7. The slurry is filtered off and dried to moisture of 7.41% at 40° C. The viscosity of the final product, determined by RVA as described above is 640±10 cP at 65° C. at 16% solid content in DI water.

Example 3—Cationic Waxy Starch Thinning

Starch B (500 g) is suspended in 750 g water at the temperature of 45° C., and then transferred to a reactor equipped with a condenser and a mechanical stirrer. To the viscous solution thus obtained, hydrochloric acid (36% aqueous solution, 15 g) is added all at once, whilst continuing the stirring. After 6 hours, soda ash is added to the slurry to neutralize pH=5-7. The slurry is filtered off and dried to moisture of 11.4% at 40° C. The viscosity of the final product, determined by RVA as described above is 255±10 cP at 65° C. at 16% solid content in DI water.

Example 4—Amphoteric Starch Thinning

The Starch C (500 g) is suspended in 750 g water at the temperature of 43° C., and then transferred to a reactor equipped with a condenser and a mechanical stirrer. To the viscous solution thus obtained, hydrochloric acid (36% aqueous solution, 15 g) is added all at once, whilst continuing the stirring. After 8 hours, soda ash is added to the slightly slurry to neutralize pH=5-7. The slurry is filtered off and dried to moisture of 7.42% at 40° C. The viscosity of the final product, determined by RVA as described above is 230±10 cP at 65° C. at 16% solid content in DI water.

Example 5—Cooked Starch

The thinned Starch B (330 g) of Example 2 was suspended in 670 g DI water and then cooked at 95° C. for 30 minutes. The dry starch content of cooked starch was adjusted to 30% for use.

Example 6—Formation of Starch-Free Slurry and Casting into Cubic Monoliths

Stucco (150 g) and tap water (107 mL) were used for each wet gypsum cube cast. The stucco, water phase and foaming agent (in these experiments, Pacific Garden® Gentle foam soap (SKU-43711), 100 mL) were rapidly combined (i.e., in the absence of starch) in a laboratory mixer operating at a mixing speed of from 1200 to 4000 revolutions per minute for 60 seconds to form a slurry, which was poured into six 1"×1"×1" cube molds to set for 40 minutes. The cast cubes were then removed from the molds, weighed, and sealed inside plastic bags to prevent moisture loss. The wet compressive strength test was performed at 5 minutes. For the dry compressive strength test, cubes were dried for 15 minutes at 180° C., then aged at 50° C. for 2 hrs. The resulting cubes had an average density of 0.847 g/cm$^3$ (wet) and 0.485 g/cm$^3$ (dry).

The compressive strengths (wet and dry) of the gypsum cubes were measured using an Instron machine and the ASTM C-472 Procedure. The compression rate was 0.03 in/min. In the procedure, 1" cubes were placed between anvil faces and compression was initiated. The compressive force was monitored continuously and the test was run until the cubes failed. The maximum compressive force was recorded and used as a measure of cube strength. The compressive strength was reported in pounds per square inch. The compressive strength of gypsum varied significantly with density. Analogous to the strength of foamed plastics, it was found that for a given formulation, the strength of gypsum cubes was generally proportional to the cubic power of the density. In this case, the following formula was used: Strength=A×(density)$^3$, in which A is a fitting constant, determined using strength and density for a sample of known density. This formula is used to adjust the strength values to a common basis density of 0.793 g/cm$^3$ and 0.5186 g/cm$^3$ for wet strength and dry strength, respectively, which values correspond to 1350 lbs/MSF board density at a thickness of ½ inch board.

Example 7—Acid-Modified Starch (Comparative)

Stucco (150 g) and tap water (107 cc) were used for each wet gypsum cube cast. Starch G (3 g, 1% based on stucco wt.) was thoroughly dry mixed first in a plastic bottle with the stucco prior to mixing with tap water. The dry ingredients, water phase and foaming agent (as above) were rapidly combined to form a slurry using a mixer operating at a mixing speed of from 1200 to 4000 revolutions per minute for 60 seconds. The slurry was poured into six 1"×1"×1" cube mold to set for 40 minutes. The cast cubes were then removed from the molds, weighed, and the compressive strength test was performed at 5 minutes. The cubes for dry core strength test were dried for 15 minutes at 180° C., and aged at 50° C. for 2 hrs. The resulting cubes had an average density of 0.931 g/cm$^3$ and 0.442 g/cm$^3$ for wet strength and dry strength, respectively.

Example 8—Cationic Dent Starch, Modified

Stucco (150 g) and tap water (107 cc) were used for each wet gypsum cube cast. Starch D (0.3 g, 0.2% based on stucco wt.) was thoroughly dry mixed first in a plastic bottle with the stucco prior to mixing with tap water. The dry ingredients, water phase and foaming agent (as above) were rapidly combined to form a slurry using a mixer operating at a mixing speed of from 1200 to 4000 revolutions per minute for 60 seconds. The slurry was poured into six 1"×1"×1" cube mold to set for 40 minutes. The cast cubes were then removed from the molds, weighed, and the compressive strength test was performed at 5 minutes. The cubes for dry core strength test were dried for 15 minutes at 180° C., and aged at 50° C. for 2 hrs. The resulting cubes had an average density of 0.822 g/cm$^3$ and 0.451 g/cm$^3$ for wet strength and dry strength test, respectively.

Example 9—Cationic Dent Starch, Modified

The procedure of Example 8 was repeated, but with 0.5% Starch D. The resulting cubes had an average density of 0.838 g/cm$^3$ and 0.38 g/cm$^3$ for wet strength and dry strength test, respectively.

Example 10—Cationic Dent Starch, Modified

The procedure of Example 8 was repeated, but with 0.75% Starch D. The resulting cubes had an average density of 0.793 g/cm$^3$ and 0.405 g/cm$^3$ for wet strength and dry strength, respectively.

Example 11—Cationic Dent Starch, Modified

The procedure of Example 8 was repeated, but with 1% Starch D. The resulting cubes had an average density of 0.823 g/cm$^3$ and 0.40 g/cm$^3$ for wet strength and dry strength, respectively.

Example 12—Cationic Dent Starch, Modified

The procedure of Example 8 was repeated, but with 2% Starch D. The resulting cubes had an average density of 0.864 g/cm$^3$ and 0.45 g/cm$^3$ for wet strength and dry strength, respectively.

Example 13—Cationic Dent Starch, Modified

The procedure of Example 8 was repeated, but with 5% Starch D. The resulting cubes had an average density of 0.899 g/cm$^3$ and 0.56 g/cm$^3$ for wet strength and dry strength, respectively.

Example 14—Thinned Cationic Dent Starch, Modified

The procedure of Example 7 was repeated, but with 1% of the thinned starch from Example 1 instead of the Starch G. The resulting cubes had an average density of 0.862 g/cm$^3$ and 0.485 g/cm$^3$ for wet strength and dry strength, respectively.

Example 15—Thinned Cationic Waxy Starch, Modified

The procedure of Example 7 was repeated, but with 1% of the thinned starch from Example 2 instead of the Starch G. The resulting cubes had an average density of 0.869 g/cm$^3$ and 0.523 g/cm$^3$ for wet strength and dry strength, respectively.

Example 16—Cationic Dent Starch, Modified

The procedure of Example 7 was repeated, but with 1% of Starch A instead of the Starch G. The resulting cubes had an average density of 0.773 g/cm$^3$ and 0.445 g/cm$^3$ for wet strength and dry strength, respectively.

Example 17—Thinned Cationic Waxy Starch, Modified

The procedure of Example 7 was repeated, but with 1% of the thinned starch from Example 3 instead of the Starch G. The resulting cubes had an average density of 0.807 g/cm$^3$ and 0.492 g/cm$^3$ for wet strength and dry strength, respectively.

Example 18—Thinned Amphoteric Waxy Starch, Modified

The procedure of Example 7 was repeated, but with 1% of the thinned starch from Example 4 instead of the Starch G. The resulting cubes had an average density of 0.833 g/cm$^3$ and 0.431 g/cm$^3$ for wet strength and dry strength, respectively.

Example 19—Cooked Thinned Cationic Dent Starch, Modified

The procedure of Example 7 was repeated, but with 1% of the thinned starch from Example 5 instead of the Starch G. The resulting cubes had an average density of 0.819 g/cm$^3$ and 0.463 g/cm$^3$ for wet strength and dry strength, respectively.

Example 20—Cationic Potato Starch, Modified

The procedure of Example 7 was repeated, but with 1% of Starch E instead of the Starch G. The resulting cubes had an average density of 0.787 g/cm$^3$ and 0.369 g/cm$^3$ for wet strength and dry strength, respectively.

Example 21—Cationic Tapioca Starch, Modified

The procedure of Example 7 was repeated, but with 1% of Starch F instead of the Starch G. The resulting cubes had an average density of 0.848 g/cm$^3$ and 0.465 g/cm$^3$ for wet strength and dry strength, respectively.

Strength values for the cubes of Comparative Example 6, 7 and Examples 8-21 are shown in Table 2, below. As strength depends on the cubic power of density, reported compressive strengths were normalized, using the formula described above, to a density of 793 g/cm$^3$ and 0.5186 g/cm$^3$ for wet strength and dry strength, respectively.

TABLE 2

| samples | Starch | Parts of starch | Normalized dry strength (psi) | Normalized wet strength (psi) |
|---|---|---|---|---|
| Example 6 |  | 0 | 128 | 62.4 |
| Example 7 | Starch G | 1% | 165.7 | 60.8 |
| Example 8 | Starch D | 0.2% | 163.5 | 66.2 |
| Example 9 | Starch D | 0.5% | 177.9 | 64.3 |
| Example 10 | Starch D | 0.75% | 192.1 | 69.9 |
| Example 11 | Starch D | 1% | 205.4 | 67.6 |
| Example 12 | Starch D | 2% | 181.6 | 69.9 |
| Example 13 | Starch D | 5% | 231.1 | 67.4 |
| Example 14 | 8 hr thinned Starch A | 1% | 159 | 72.9 |
| Example 15 | 4 hr thinned Starch A | 1% | 186 | 69.9 |
| Example 16 | Starch A | 1% | 152.5 | 77.4 |
| Example 17 | Thinned Starch B | 1% | 210.6 | 75.2 |
| Example 18 | Thinned Starch C | 1% | 222.7 | 64.2 |
| Example 19 | Cooked thinned Starch C | 1% | 188.8 | 60.6 |
| Example 20 | Starch E | 1% | 171.8 | 72.2 |
| Example 21 | Starch F | 1% | 154 | 71.6 |

Figure 2:
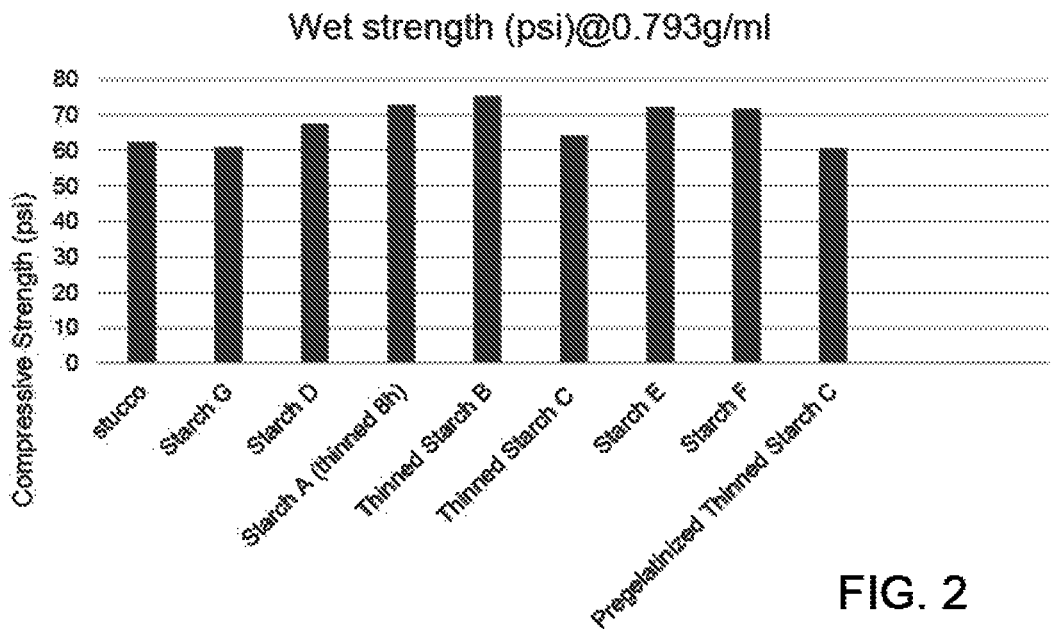
FIGS. 2-7 provide bar graphs of data of Table 2.
Figure 3:
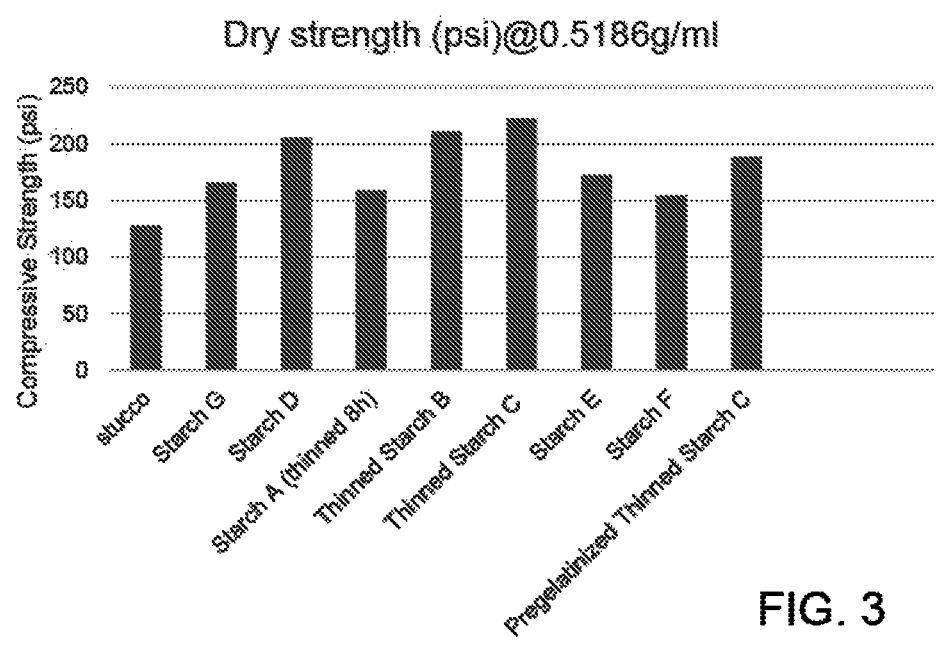
Figure 4:
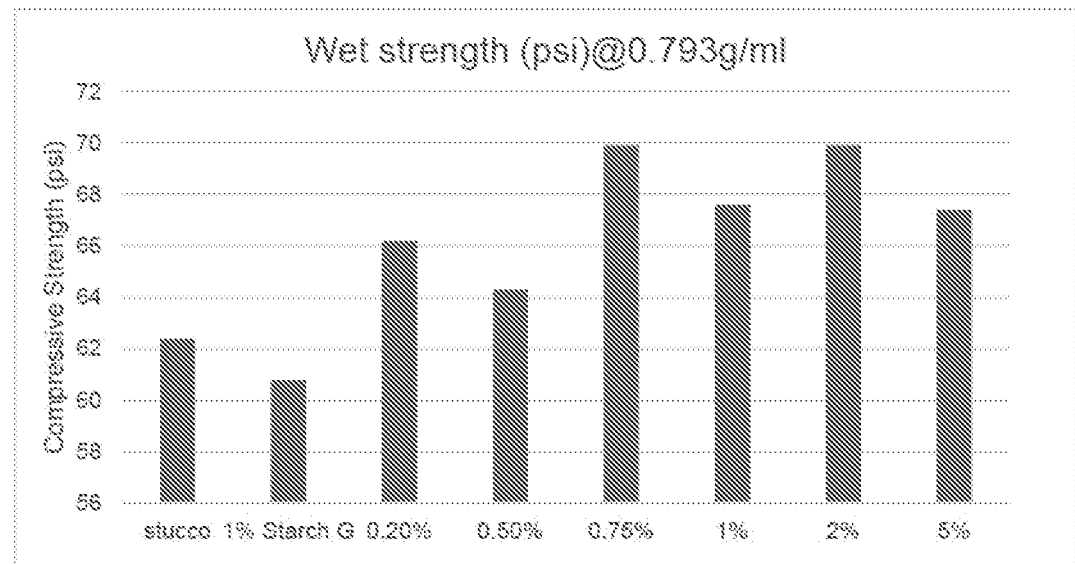
Figure 5:
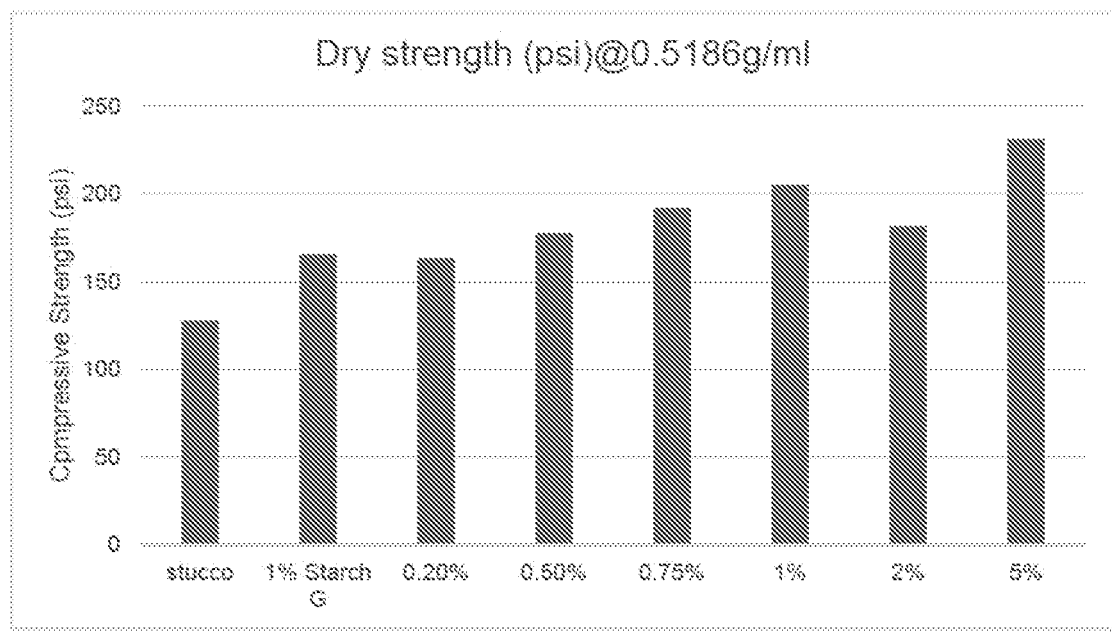
Figure 6:
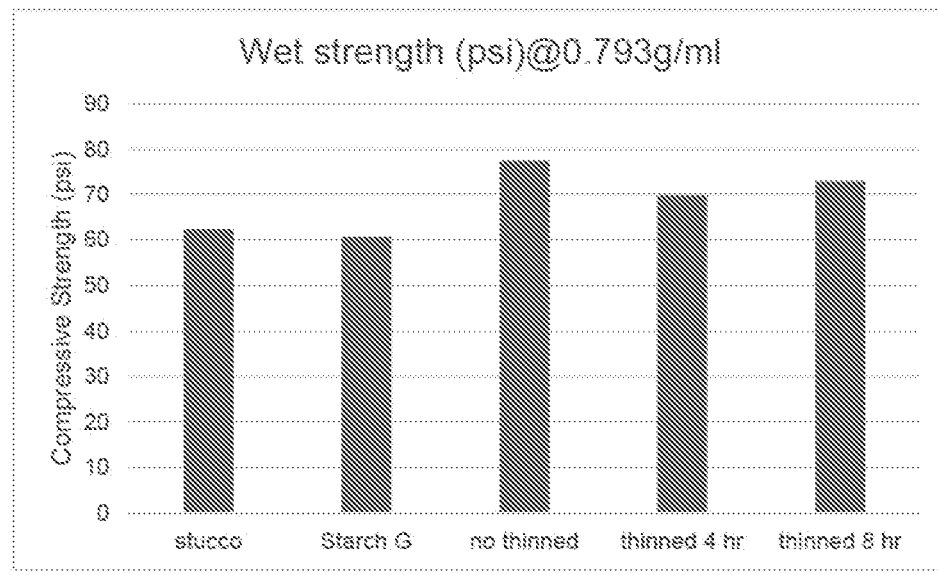
Figure 7:
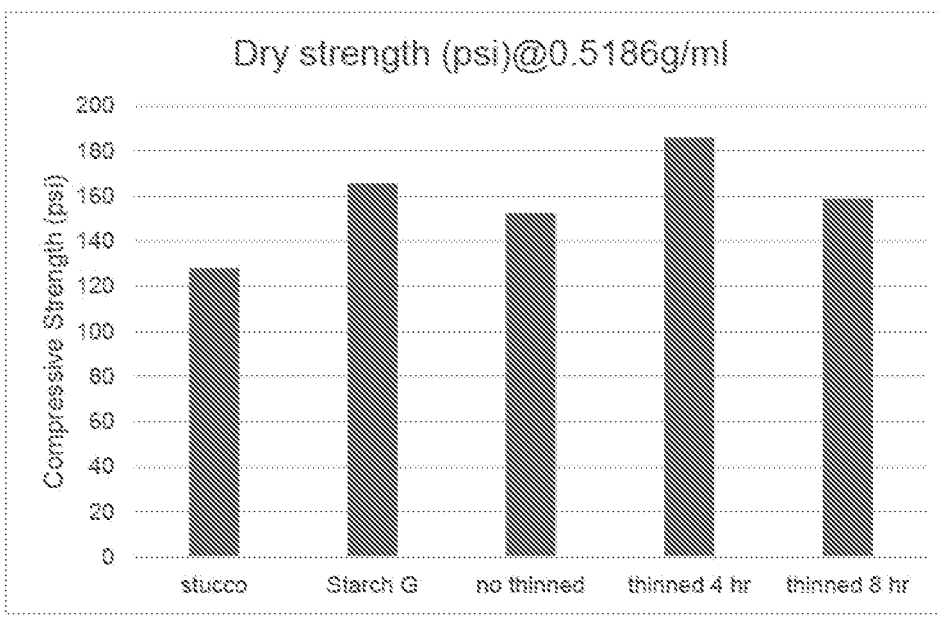

The data are shown in a variety of graphs. FIG. 2 provides a bar graph of wet strengths of samples made with different starches. FIG. 3 provides a bar graph of dry strengths of samples made with different starches. FIG. 4 provides a bar graph of wet strengths of samples made with Starch D in different concentrations. FIG. 5 provides a bar graph of dry strengths of samples made with Starch D in different concentrations. FIG. 6 provides a bar graph of wet strengths of samples made with Starch A at different viscosities. And FIG. 7 provides a bar graph of dry strengths of samples made with Starch A at different viscosities.

As can be seen from the data in Table 2, the wet compressive strength of the cube increased with the addition of cationic starches, which starches exhibited a variety of charge densities, viscosities (and thus molecular weights), sources (dent maize, waxy maize, potato, tapioca), and usages (0.2-5%). Addition of cationic starches improved the gypsum wet compressive strength by from 3%-24% as compared to a starch-free formulation (Example 6); and improved wet compressive strength by from 5.7%-27% as compared to a formulation using an acid-modified starch (Starch G, Example 7). And wet compressive strengths were improved for granular starches as compared to the pregelatinized starch C.

More importantly, the use of cationic starches was shown to provide a significant increase in dry compressive strength. As illustrated in Table 2, the cationic starch can provide improvements of gypsum dry compressive strength from 20-74% as compared to stucco. And in examples 9-13, 15 and 17-20, the use of cationic starch improved the gypsum dry compressive strength from 3.7%-34% as compared to acid-modified starch (Starch G, example 7).

Example 22—Larger Cube, Starch-Free

The procedure of Example 6 was repeated except that 2"×2"×2" cubes were used. All the cubes were made with pre-generated foam (made by beating air into water and surfactant, then mixing that foam with gypsum, and were formulated to have the same cube density and predicted equivalent board weight in lbs/MSF. The average wet cube weight was 95.3 g. The cubes were dried in the three oven zones at 245° C. for about 10 minutes then at 107° C. for about 10 minutes and finally at 45° C. for over three days or until a constant weight was achieved before testing. The average dry cube weight was 55.72 g. The compressive strength of the gypsum cubes was measured using an Instron machine and the ASTM C-472 Procedure. The compression rate was reduced to 0.03 in/min. In the procedure. 2" cubes were placed between anvil faces and compression was initiated. The compressive force was monitored continuously and the test was run until the cubes failed. The maximum compressive force was recorded as a measure of cube strength. The compressive strength was reported in pounds per square inch, and was not normalized for density.

Example 23—Larger Cubes, Acid-Modified Starch

The procedure of Example 22 was repeated, except that 1% Starch G was added to the formulation. The average wet cube weight was 93.9 g. The average dry cube weight was 55.9 g.

Example 24—Larger Cubes, Cationic Dent Starch

The procedure of Example 22 was repeated except that 1% Starch D was added to the formulation. The average wet cube weight was 98.2 g. The average dry cube weight was 59 g.

Example 25—Larger Cubes, Pregelatinized Unmodified Starch

The procedure of Example 22 was repeated except that 1% Starch H was added to the formulation. The average wet cube weight was 100.7 g. The average dry cube weight was 59 g.

Table 3 provides measured wet and dry strengths for the samples of Examples 22-25, not normalized for density. The data are the average of three points and are generally t 10 psi.

TABLE 3

| samples | Starch | Parts of starch | Wet strength (psi) | Dry strength (psi) |
|---|---|---|---|---|
| Example 22 | none | 0 | 85 | 149 |
| Example 23 | Starch G | 1% | 69 | 172 |
| Example 24 | Starch D | 1% | 97 | 209 |
| Example 25 | Starch H | 1% | 75 | 190 |

Figure 8:
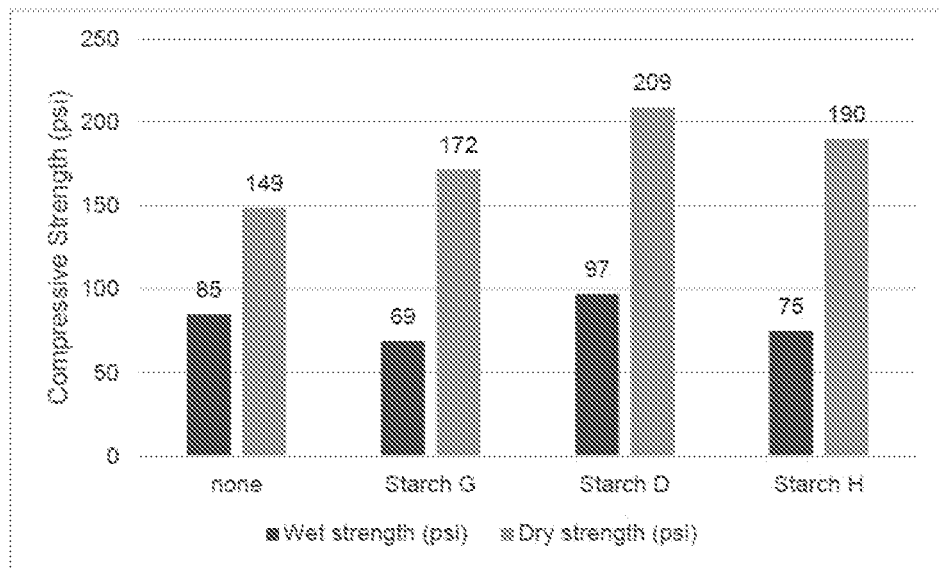
FIG. 8 provides a bar graph of data of Table 3.

The data are provided in a bar graph in FIG. 8. As illustrated in Table 3, the sample of Example 24, using a cationic starch as described herein generally provided superior wet and dry cube compressive strength as compared to samples lacking starch, using conventional acid-modified starch, or using a pregelatinized native starch.

Example 26—Formation of Gypsum Boards

Laboratory sample gypsum boards were made with a lightweight gypsum board target density of 1350 t 50 lbs/MSF using Starch G, Starch D and Starch H. The water and foam were adjusted for each formulation to achieve this target density.

All lab board sample formulations included (unless otherwise specified):
Molding plaster from a natural gypsum source—USG No 1
Bond starch Ball milled accelerator from a North American natural gypsum source, milled with a powdered surfactant additive
Potassium sulfate
Chelating agent set retarder (liquid)
Pregenerated foam made from a stable/unstable foaming agent concentrate blend
Cream and grey paper from a nearby plant
Data for the boards are provided in Table 4 and in FIG. 9.

TABLE 4

| Lab Board | Board Weight (lbs/MSF) | Water Stucco Ratio |
|---|---|---|
| Reference | 1342 | 0.87 |
|  | 1341 | 0.87 |
| 1% Starch G | 1349 | 0.87 |
|  | 1339 | 0.87 |
| 1% Starch D | 1363 | 0.87 |
|  | 1347 | 0.87 |
| 1% Starch H | 1377 | 0.93 |
|  | 1339 | 0.93 |

Nail pull testing was performed as per ASTM standard C473 nail pull resistance method B, with 9 consecutive tests spaced approximately 3" apart for each formed board sample. The purpose of this test was to evaluate the resistance of the board from being pulled from its fastened position in a plane normal to the plane of the board. The ASTM specifications for ½" boards is 77 lbf.

Nail pull results shown in Table 5 are the average of 9 measurements tested on each gypsum board sample:

TABLE 5

| Lab Board | Board Weight (lbs/MSF) | Average Nail Pull Resistance (lbf) | Std. dev. Nail Pull Resistance (lbf) | Nail Pull Resistance Norm'd to a Std. Board Weight of 1350 lbs/MSF (lbs) | Average Nail Pull Resistance Norm'd to a Std. Board Weight of 1350 lbs/MSF (lbs) |
|---|---|---|---|---|---|
| Reference Board | 1342 | 58.8 | 7.8 | 59.3 | 59.4 |
| Reference Board | 1341 | 58.9 | 4.7 | 59.4 |  |
| 1% Starch G | 1349 | 71.9 | 2.6 | 72.0 | 72.3 |
| 1% Starch G | 1339 | 71.9 | 6.3 | 72.6 |  |
| 1% Starch D | 1363 | 82.1 | 6.1 | 81.3 | 79.5 |
| 1% Starch D | 1347 | 77.5 | 4.6 | 77.7 |  |
| 1% Starch H | 1377 | 76.9 | 4.7 | 75.3 | 74.9 |
| 1% Starch H | 1339 | 73.9 | 5.5 | 74.6 |  |

As illustrated in Table 5, boards that included cationic starch gave improved nail pull resistance, which exceeded the ASTM standard. The board weight may be significantly reduced in comparison with the control boards made using commercial wall board starches. Therefore, in this example, cationic starch can be used to formulate a usable, flowable slurry by maintaining substantially the same water:starch ratio, yet still provide adequate strength.

Surprisingly, the data demonstrate that adding cationic starch to gypsum slurry can improve wet strength, dry strength and nail pull strength of the resulting wall board. The improvement in strength performance can enable lighter-weight wallboard.

Various aspects of the disclosure are provided by the enumerated embodiments below, which can be combined in any number and in any fashion that is not logically or technically inconsistent.

Embodiment 1. A calcium sulfate slurry composition comprising
calcium sulfate present substantially in the form of one or more hydrates, the calcium sulfate being present in an amount in the range of 70-99.8 wt % on a dry basis, calculated as stucco;
a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %;
water, in an amount sufficient to form a slurry.

Embodiment 2. The calcium sulfate slurry according to embodiment 1, wherein the cationic starch is present in an amount in the range of 0.15-5 wt %, e.g., 0.15-2 wt %, of the amount of calcium sulfate as stucco on a dry basis.

Embodiment 3. The calcium sulfate slurry according to embodiment 1, wherein the cationic starch is present in an amount in the range of 0.25-5 wt %, e.g., 0.25-2 wt %, of the amount of calcium sulfate as stucco on a dry basis.

Embodiment 4. The calcium sulfate slurry according to embodiment 1, wherein the cationic starch is present in an amount in the range of 0.5-10 wt %, e.g., 0.5-7 wt %, 0.5-5 wt %, or 0.5-2 wt %, of the amount of calcium sulfate as stucco on a dry basis.

Embodiment 5. The calcium sulfate slurry according to embodiment 1, wherein the cationic starch is present in an amount in the range of 1-10 wt %, e.g., 1-7 wt % or 1-5 wt %, of the amount of calcium sulfate as stucco on a dry basis.

Embodiment 6. The calcium sulfate slurry according to embodiment 1, wherein the cationic starch is present in an amount in the range of 2-10 wt %, e.g., 2-7 wt %, 2-5 wt %, or 5-10 wt %, of the amount of calcium sulfate as stucco on a dry basis.

Embodiment 7. The calcium sulfate slurry according to any of embodiments 1-6, wherein the cationic starch has a % N value in the range of 0.13-2.0 wt %, e.g., 0.15-2 wt %, or 0.2-2.0 wt %.

Embodiment 8. The calcium sulfate slurry according to any of embodiments 1-6, wherein the cationic starch has a % N value in the range of 0.10-1.8 wt %, e.g., 0.13-1.8 wt %, 0.15-1.8 wt %, or 0.2-1.8 wt %.

Embodiment 9. The calcium sulfate slurry according to any of embodiments 1-6, wherein the cationic starch has a % N value in the range of 0.10-1.5 wt %, e.g., 0.13-1.5 wt %, or 0.15-1.5 wt %, or 0.2-1.5 wt %.

Embodiment 10. The calcium sulfate slurry according to any of embodiments 1-6, wherein the cationic starch has a % N value in the range of 0.10-1.0 wt %, e.g., 0.13-1.0 wt %, or 0.15-1.0 wt %, or 0.2-1 wt %.

Embodiment 11. The calcium sulfate slurry according to any of embodiments 1-6, wherein the cationic starch has a % N value in the range of 0.10-0.8 wt %, e.g., 0.13-0.8 wt %, or 0.15-0.8 wt %, or 0.2-0.8 wt %.

Embodiment 12. The calcium sulfate slurry according to any of embodiments 1-6, wherein the cationic starch has a % N value in the range of 0.10-0.5 wt %, e.g., 0.13-0.5 wt %, or 0.15-0.5 wt %, or 0.2-0.5 wt %.

Embodiment 13. The calcium sulfate slurry according to any of embodiments 1-12, wherein the cationic starch has an RVA viscosity value in the range of 100-4000 cP, e.g., 200-3000 cP, or 200-2000 cP, or 200-1500 cP, at 65° C. and 16 wt %.

Embodiment 14. The calcium sulfate slurry according to any of embodiments 1-12, wherein the cationic starch has an RVA viscosity value of at least 200 cP at 65° C. and 16 wt %.

Embodiment 15. The calcium sulfate slurry according to any of embodiments 1-12, wherein the cationic starch has an RVA viscosity value in the range of 200-4000 cP, e.g., 200-3000 cP, or 200-2000 cP, or 200-1500 cP, at 65° C. and 16 wt %.

Embodiment 16. The calcium sulfate slurry according to any of embodiments 1-12, wherein the cationic starch has an RVA viscosity value of at least 350 cP at 65° C. and 16 wt %.

Embodiment 17. The calcium sulfate slurry according to any of embodiments 1-12, wherein the cationic starch has an RVA viscosity value in the range of 350-4000 cP, e.g., 350-3000 cP or 350-2000 cP, at 65° C. and 16 wt %.

Embodiment 18. The calcium sulfate slurry according to any of embodiments 1-12, wherein the cationic starch has an RVA viscosity value of at least 500 cP, e.g., at least 1000 cP, at 65° C. and 16 wt %.

Embodiment 19. The calcium sulfate slurry according to any of embodiments 1-12, wherein the cationic starch has an RVA viscosity value in the range of 500-4000 cP, e.g., 500-3000 cP, 500-2000 cP, 1000-4000, or 1000-3000, at 65° C. and 16 wt %.

Embodiment 20. The calcium sulfate slurry according to any of embodiments 1-12, wherein the cationic starch has an RVA viscosity value of at least 2000 cP, e.g., at least 3000 cP or at least 4000 cP, at 65° C. and 16 wt %.

Embodiment 21. The calcium sulfate slurry according to any of embodiments 1-12, wherein the cationic starch has an RVA viscosity value in the range of 100-1000 cP, e.g., 150-1000 cP or 200-1000 cP, at 65° C. and 16 wt %.

Embodiment 22. The calcium sulfate slurry according to any of embodiments 1-21, wherein the cationic starch is thinned by hydrolysis, e.g., acid-catalyzed hydrolysis, enzymatic hydrolysis.

Embodiment 23. The calcium sulfate slurry according to any of embodiments 1-21, wherein the cationic starch is thinned by bleaching.

Embodiment 24. The calcium sulfate slurry according to any of embodiments 1-23, wherein the cations of the cationic starch are substantially provided by modification with groups having the formula $(R^1)_3N^+$-L-, where each $R^1$ is individually $C_1$-$C_8$ alkyl, L is hydroxy-substituted $C_2$-$C_6$ alkandiyl, and the -L- makes an ethereal bond to a glucoside of the starch.

Embodiment 25. The calcium sulfate slurry according to any of embodiments 1-23, wherein the cations of the cationic starch are substantially provided by modification with groups having the formula $(R^1)(R^2)_2N^+$-L-, where each $R^1$ is individually $C_1$-$C_{20}$ alkyl (e.g., stearyl, dodecyl), each $R^2$ is individually $C_1$-$C_3$ alkyl (e.g., methyl), L is hydroxy-substituted $C_2$-$C_6$ alkandiyl, and the -L- makes an ethereal bond to a glucoside of the starch.

Embodiment 26. The calcium sulfate slurry according to any of embodiments 1-25, wherein the cationic starch is modified by cross-linking (e.g., by disubstituted phosphate, adipate or epichlorohydrin, or by dehydration).

Embodiment 27. The calcium sulfate slurry according to any of embodiments 1-25, wherein the cationic starch is not modified by cross-linking.

Embodiment 28. The calcium sulfate slurry according to any of embodiments 1-27, wherein the cationic starch is modified by etherification (e.g., by ethyl groups, hydroxypropyl groups and/or hydroxyethyl groups) and/or esterification (e.g., by acetate).

Embodiment 29. The calcium sulfate slurry according to any of embodiments 1-27, wherein the cationic starch is modified by etherification or esterification.

Embodiment 30. The calcium sulfate slurry according to any of embodiments 1-29, wherein the cationic starch is modified by amphoteric modification (e.g., by phosphate, octenylsuccinate, succinate).

Embodiment 31. The calcium sulfate slurry according to any of embodiments 1-29, wherein the cationic starch is not modified by amphoteric modification.

Embodiment 32. The calcium sulfate slurry according to any of embodiments 1-31, wherein the cationic starch is modified by oxidation.

Embodiment 33. The calcium sulfate slurry according to any of embodiments 1-31, wherein the cationic starch is not modified by oxidation.

Embodiment 34. The calcium sulfate slurry according to any of embodiments 1-25, wherein the cationic starch does not include modification other than cationic modification and acid thinning.

Embodiment 35. The calcium sulfate slurry according to any of embodiments 1-34, wherein the cationic starch has a net degree of cationic substitution in the range of 0.01 to 0.25, e.g., 0.01 to 0.20, or 0.01 to 0.15.

Embodiment 36. The calcium sulfate slurry according to any of embodiments 1-34, wherein the cationic starch has a net degree of cationic substitution in the range of 0.02 to 0.50, e.g., 0.02 to 0.25, or 0.02 to 0.20, or 0.02 to 0.15.

Embodiment 37. The calcium sulfate slurry according to any of embodiments 1-34, wherein the cationic starch has a net degree of cationic substitution in the range of 0.05 to 0.50, e.g., 0.05 to 0.25, or 0.05 to 0.20, or 0.05 to 0.15.

Embodiment 38. The calcium sulfate slurry according to any of embodiments 1-34, wherein the cationic starch has a net degree of cationic substitution in the range of 0.01 to 0.12, e.g., 0.02 to 0.12, or 0.05 to 0.12.

Embodiment 39. The calcium sulfate slurry according to any of embodiments 1-34, wherein the cationic starch has a net degree of cationic substitution in the range of 0.01 to 0.10, e.g., 0.02 to 0.10, or 0.05 to 0.10.

Embodiment 40. The calcium sulfate slurry according to any of embodiments 1-39, wherein the cationic starch is a maize starch.

Embodiment 41. The calcium sulfate slurry according to any of embodiments 1-39, wherein the cationic starch is a dent maize starch.

Embodiment 42. The calcium sulfate slurry according to any of embodiments 1-39, wherein the cationic starch is a waxy maize starch.

Embodiment 43. The calcium sulfate slurry according to any of embodiments 1-39, wherein the cationic starch is a tapioca starch.

Embodiment 44. The calcium sulfate slurry according to any of embodiments 1-39, wherein the cationic starch is a potato starch.

Embodiment 45. The calcium sulfate slurry according to any of embodiments 1-39, wherein the cationic starch is a wheat starch, a rice starch (e.g., a waxy rice starch, a glutinous rice starch or a sweet rice starch), an oat starch, a barley starch (e.g., a waxy barley starch), a sago starch, or a mixture thereof.

Embodiment 46. The calcium sulfate slurry according to any of embodiments 1-45, wherein the cation starch has less than 2% water solubility.

Embodiment 47. The calcium sulfate slurry according to any of embodiments 1-45, wherein the cation starch has less than 1.5% water solubility.

Embodiment 48. The calcium sulfate slurry according to any of embodiments 1-47, wherein the cationic starch comprises amylose in an amount in the range of 0 to 70 wt % (e.g., 0-60 wt %, 0-50 wt %) and amylopectin in an amount in the range of 30 to 100 wt % (e.g., 40-100 wt %, 50-100 wt %).

Embodiment 49. The calcium sulfate slurry according to any of embodiments 1-47, wherein the cationic starch comprises amylose in an amount in the range of 20-30 wt %, and amylopectin in an amount in the range of 70-80 wt %.

Embodiment 50. The calcium sulfate slurry according to any of embodiments 1-49, wherein the cationic starch includes (or is) a granular cationic starch.

Embodiment 51. The calcium sulfate slurry according to any of embodiments 1-49, wherein the cationic starch includes (or is) a pregelatinized cationic starch.

Embodiment 52. The calcium sulfate slurry according to any of embodiments 1-49, wherein the cationic starch includes both a granular cationic starch and a pregelatinized cationic starch.

Embodiment 53. The calcium sulfate slurry according to any of embodiments 1-52, wherein the calcium sulfate is present in the slurry in an amount in the range of 70-99 wt %, e.g., 70-98 wt %, 70-95% or 70-90%, on a dry basis calculated as stucco.

Embodiment 54. The calcium sulfate slurry according to any of embodiments 1-52, wherein the calcium sulfate is present in the slurry in an amount in the range of 80-99.8 wt %, e.g., 80-99 wt %, 80-98 wt % or 80-95%, on a dry basis calculated as stucco.

Embodiment 55. The calcium sulfate slurry according to any of embodiments 1-54, wherein the calcium sulfate slurry is made by a method comprising combining stucco and water.

Embodiment 56. The calcium sulfate slurry according to any of embodiments 1-55, wherein the water:stucco ratio is in the range of 0.3-1.5 on a weight:weight basis, with calcium sulfate being calculated as stucco.

Embodiment 57. The calcium sulfate slurry according to any of embodiments 1-55, wherein the water:stucco ratio is in the range of 0.3-1.0 on a weight:weight basis, with calcium sulfate being calculated as stucco.

Embodiment 58. The calcium sulfate slurry according to any of embodiments 1-57, further comprising one or more additional starches.

Embodiment 59. The calcium sulfate slurry according to embodiment 58, wherein one or more of the one or more additional starches is an unmodified starch, an ethylated starch, a hydroxyethylated starch, a hydroxypropylated starch, a hydrolyzed starch or an oxidized starch.

Embodiment 60. The calcium sulfate slurry according to embodiment 58 or embodiment 56, wherein one or more of the one or more additional starches is an anionic starch or an amphoteric starch having a net anionic charge.

Embodiment 61. The calcium sulfate slurry according to any of embodiments 1-57, wherein substantially no (e.g., no more than 0.05 wt % of the amount of calcium sulfate as stucco on a dry basis) additional starch is present in the slurry.

Embodiment 62. The calcium sulfate slurry according to any of embodiments 1-61, wherein substantially no (e.g., no more than 0.05 wt % of the amount of calcium sulfate as stucco on a dry basis) anionic polymer is present in the slurry.

Embodiment 63. The calcium sulfate slurry according to any of embodiments 1-62, further including a fibrous material, e.g., glass fiber and paper fiber.

Embodiment 64. The calcium sulfate slurry according to any of embodiments 1-63, further including a foaming agent.

Embodiment 65. The calcium sulfate slurry according to any of embodiments 1-64, further including a dispersant.

Embodiment 66. The calcium sulfate slurry according to any of embodiments 1-65, further including one or more components selected from set accelerators (e.g., potash, ammonium sulfate, aluminum sulfate, ball mill accelerator); set retarders (e.g., amino acid oligomers, chelators like DTPA and EDTA, and polyacrylic acids); boric acid; sodium trimetaphosphate; sugar; silicones and waxes; fire retardant fillers such as vermiculite; and biocides.

Embodiment 67. A method for making a gypsum-based material, the method comprising
 providing a slurry according to any of embodiments 1-86;
 allowing the slurry to set via hydration of stucco to gypsum;
 allowing the set slurry to dry.

Embodiment 68. The method according to embodiment 67, wherein the gypsum-based material, wherein the slurry is formed against one or more liners.

Embodiment 69. The method according to embodiment 67 or embodiment 68, wherein each of the one or more liners is made of a material selected from paper and fiberglass mesh.

Embodiment 70. A gypsum-based material comprising:
 calcium sulfate present substantially in the form of gypsum, the calcium sulfate being present in an amount in the range of 70-99.8 wt % on a dry basis, calculated as stucco; and
 a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %.

Embodiment 71. The gypsum-based material according to embodiment 70, wherein at least 90 mol % (e.g., at least 95 mol % or at least 98 mol %) of the calcium sulfate is present in the form of gypsum.

Embodiment 72. The gypsum-based material according to embodiment 70 or embodiment 71, in the form of a monolithic set slurry.

Embodiment 73. The gypsum-based material according to any of embodiments 70-72, wherein the cationic starch is present in an amount as described in any of embodiments 2-6.

Embodiment 74. The gypsum-based material according to any of embodiments 70-73, wherein the cationic starch is as described in any of embodiments 7-52.

Embodiment 75. The gypsum-based material according to any of embodiments 70-74, further comprising one or more additional starches.

Embodiment 76. The gypsum-based material according to embodiment 75, wherein one or more of the one or more additional starches is an unmodified starch, an ethylated starch, a hydroxyethylated starch, a hydroxypropylated starch, a hydrolyzed starch or an oxidized starch.

Embodiment 77. The gypsum-based material according to embodiment 75 or embodiment 76, wherein one or more of the one or more additional starches is an anionic starch or an amphoteric starch having a net anionic charge.

Embodiment 78. The gypsum-based material according to any of embodiments 70-74, wherein substantially no (e.g., no more than 0.05 wt % of the amount of calcium sulfate as stucco on a dry basis) additional starch is present in the gypsum-based material.

Embodiment 79. The gypsum-based material slurry according to any of embodiments 70-78, wherein substantially no (e.g., no more than 0.05 wt % of the amount of calcium sulfate as stucco on a dry basis) anionic polymer is present in the gypsum-based material.

Embodiment 80. The gypsum-based material according to any of embodiments 70-79, further including a fibrous material, e.g., glass fiber and paper fiber.

Embodiment 81. The gypsum-based material according to any of embodiments 70-80, further including a foaming agent.

Embodiment 82. The gypsum-based material according to any of embodiments 70-81, further including a dispersant.

Embodiment 83. The gypsum-based material according to any of embodiments 70-82, further including one or more components selected from set accelerators (e.g., potash, ammonium sulfate, aluminum sulfate, ball mill accelerator); set retarders (e.g., amino acid oligomers, chelators like DTPA and EDTA, and polyacrylic acids); boric acid; sodium trimetaphosphate; sugar; silicones and waxes; fire retardant fillers such as vermiculite; and biocides.

Embodiment 84. The gypsum-based material according to any of embodiments 70-82, wherein the gypsum-based material is disposed against one or more liners.

Embodiment 85. The gypsum-based material according to embodiment 84, wherein each of the one or more liners is made of a material selected from paper and fiberglass mesh.

Embodiment 86. The gypsum-based material according to any of embodiments 70-85, made by a process according to any of embodiments 67-89.

Embodiment 87. A gypsum-based material made by a process according to any of embodiments 67-69.

Embodiment 88. The gypsum-based material according to any of embodiments 70-87, having a density of less than 0.7 g/cm$^3$.

Embodiment 89. The gypsum-based material according to any of embodiments 70-88, in the form of a building material, e.g., a building board.

Embodiment 90. The gypsum-based material according to embodiment 89, wherein the building material comprises one or more liners enveloping the gypsum-based material.

Embodiment 91. The gypsum-based material according to embodiment 90, wherein each of the one or more liners is made of paper or fiberglass mesh.

Embodiment 92. The gypsum-based material according to any of embodiments 70-91, having a board weight in the range of 1000-1500 lbs/MSF.

Embodiment 93. The gypsum-based material according to embodiment 92, wherein the building board has a board thickness in the range of 5/16-9/16 inch, e.g., 3/8 inch, 1/2 inch or 5/8 inch.

Embodiment 94. The gypsum-based material according to any of embodiments 70-93, wherein the gypsum-based material has a density in the range of 0.3-0.8 g/cm$^3$.

Embodiment 95. A building structure comprising a gypsum-based material according to any of embodiments 89-95.

Embodiment 96. The building structure according to embodiment 95, wherein the gypsum-based material is in the form of a wallboard forming a wall of the building.

Embodiment 97. The building structure according to embodiment 95, wherein the gypsum-based material is in the form of a board forming a ceiling of the building.

Embodiment 98. The building structure according to any of embodiments 95-97, wherein the building structure is a commercial building.

Embodiment 99. The building structure according to any of embodiments 95-97, wherein the building structure is a residential building.

Embodiment 100. A method of forming a wall or a ceiling of a building structure, the method comprising providing a gypsum-based material according to any of embodiments 89-95, and affixing the gypsum-based material to one or more framing members of the building structure.

Embodiment 101. The slurry, method, gypsum-based material or building structure of any of claims 1-100, wherein the slurry or gypsum-based material comprises substantially no alkyl diketene dimer or reaction product thereof.

Embodiment 102. The method, gypsum-based material or building structure of any of claims 1-101, wherein the slurry provides an increased wet compressive strength of at least 3% (e.g., 3-24%, 5-24% or 10-24%) greater than that of the same formulation lacking starch.

Embodiment 103. The method, gypsum-based material or building structure of any of claims 1-102, wherein the slurry provides an increased wet compressive strength of at least 5% (e.g., 5-27%, 10-27% or 15-27%) greater than that of the same formulation using an acid thinned starch instead of the cationic starch.

Embodiment 104. The method, gypsum-based material or building structure of any of claims 1-103, wherein the slurry or gypsum-based material provides an increased dry compressive strength of at least 20% (e.g., 20-75%, or 30-75%, or 40-75%) greater than that of the same formulation lacking starch.

Embodiment 105. The method, gypsum-based material or building structure of any of claims 1-104, wherein the slurry or gypsum-based material provides an increased dry compressive strength of at least 4% (e.g., 4-37%, 10-37% or 15-37% greater than that of the same formulation using an acid thinned starch instead of the cationic starch.

Embodiment 106. A method of using a gypsum-based material in a building board or a building structure (e.g., as a wall or a ceiling), the gypsum-based material comprising:
  calcium sulfate present substantially in the form of gypsum, the calcium sulfate being present in an amount in the range of 70-99.8 wt % on a dry basis, calculated as stucco; and
  a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %.

Embodiment 107. The method of embodiment 106, as further described with respect to any of embodiments 1-105.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended embodiments and their equivalents.

What is claimed is:

1. A calcium sulfate slurry composition comprising
calcium sulfate present substantially in the form of one or more hydrates, the calcium sulfate being present in an amount in the range of 70-99.8 wt % on a dry basis, calculated as stucco;
a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %;
water, in an amount sufficient to form a slurry,
wherein the cationic starch has a water solubility of no more than 3%.

2. The calcium sulfate slurry according to claim 1, further comprising a foaming agent.

3. The calcium sulfate slurry according to claim 1, wherein the cationic starch is present in an amount in the range of 0.5-10 wt % of the amount of calcium sulfate as stucco on a dry basis.

4. The calcium sulfate slurry according to claim 1, wherein the cationic starch has a % N value in the range of 0.2-2.0 wt %.

5. The calcium sulfate slurry according to claim 1, wherein the slurry provides an increased wet compressive strength of at least 3% greater than that of the same formulation lacking starch.

6. The calcium sulfate slurry according to claim 1, wherein the cationic starch has an RVA viscosity value in the range of 200-4000 cP at 65° C. and 16 wt %.

7. The calcium sulfate slurry according to claim 1, wherein the cationic starch is thinned by hydrolysis.

8. The calcium sulfate slurry according to claim 1, wherein the cations of the cationic starch are substantially provided by modification with groups having the formula $(R^1)_3N^+$-L-, where each $R^1$ is individually $C_1$-$C_8$ alkyl, L is hydroxy-substituted $C_2$-$C_6$ alkandiyl, and the -L- makes an ethereal bond to a glucoside of the starch.

9. The calcium sulfate slurry according to claim 1, wherein the cations of the cationic starch are substantially provided by modification with groups having the formula $(R^1)(R^2)_2N^+$-L-, where each $R^1$ is individually $C_1$-$C_{20}$ alkyl, each $R^2$ is individually $C_1$-$C_3$ alkyl, L is hydroxy-substituted $C_2$-$C_6$ alkandiyl, and the -L- makes an ethereal bond to a glucoside of the starch.

10. The calcium sulfate slurry according to claim 1, wherein the cationic starch is modified by amphoteric modification.

11. The calcium sulfate slurry according to claim 1, wherein the cationic starch is not modified by amphoteric modification.

12. The calcium sulfate slurry according to claim 1, wherein the cationic starch does not include modification other than cationic modification and acid thinning.

13. The calcium sulfate slurry according to claim 1, wherein the cationic starch has a net degree of cationic substitution in the range of 0.05 to 0.50.

14. The calcium sulfate slurry according to claim 1, wherein the cationic starch has a net degree of cationic substitution in the range of 0.01 to 0.12.

15. The calcium sulfate slurry according to claim 1, wherein the cationic starch is a maize starch.

16. The calcium sulfate slurry according to claim 1, wherein the cationic starch is a granular cationic starch.

17. The calcium sulfate slurry according to claim 1, wherein substantially no additional starch is present in the slurry.

18. The calcium sulfate slurry according to claim 1, wherein no more than 0.05 wt % anionic polymer is present in the slurry.

19. A calcium sulfate slurry composition comprising
calcium sulfate present substantially in the form of one or more hydrates, the calcium sulfate being present in an amount in the range of 70-99.8 wt % on a dry basis, calculated as stucco;
a cationic starch present in an amount of 0.10-10 wt % of the amount of calcium sulfate as stucco on a dry basis, the cationic starch being substituted with amine and/or ammonium groups and having a % N value in the range of 0.10 wt % to 2 wt %, and an RVA viscosity value of at least 100 cP at 65° C. and 16 wt %;
water, in an amount sufficient to form a slurry,
wherein the cations of the cationic starch are substantially provided by modification with groups having the formula $(R^1)(R^2)_2N^+$-L-, where each $R^1$ is individually $C_1$-$C_{20}$ alkyl, each $R^2$ is individually $C_1$-$C_3$ alkyl, L is hydroxy-substituted $C_2$-$C_6$ alkandiyl, and the -L- makes an ethereal bond to a glucoside of the starch.

20. The calcium sulfate slurry according to claim 19, further comprising a foaming agent.

21. The calcium sulfate slurry according to claim 19, wherein the cationic starch is present in an amount in the range of 0.5-10 wt % of the amount of calcium sulfate as stucco on a dry basis.

22. The calcium sulfate slurry according to claim 19, wherein the cationic starch has a % N value in the range of 0.2-2.0 wt %.

23. The calcium sulfate slurry according to claim 19, wherein the cationic starch has an RVA viscosity value in the range of 200-4000 cP at 65° C. and 16 wt %.

24. The calcium sulfate slurry according to claim 19, wherein the cationic starch has a net degree of cationic substitution in the range of 0.05 to 0.50.

25. The calcium sulfate slurry according to claim 19, wherein the slurry provides an increased wet compressive strength of at least 3% greater than that of the same formulation lacking starch.

* * * * *